United States Patent
Sullivan et al.

(10) Patent No.: US 7,241,232 B2
(45) Date of Patent: Jul. 10, 2007

(54) GOLF BALL HAVING DUAL CORE AND THIN POLYURETHANE COVER FORMED BY RIM

(75) Inventors: Michael J. Sullivan, Barrington, RI (US); R. Dennis Nesbitt, Westfield, MA (US); Thomas J. Kennedy, III, Wilbraham, MA (US); Michael John Tzivanis, Chicopee, MA (US); Mark L. Binette, Ludlow, MA (US); Viktor Keller, Enfield, CT (US); William M. Risen, Jr., Rumford, RI (US)

(73) Assignee: Callaway Golf Company, Carlsbad, CA (US)

( * ) Notice: Subject to any disclaimer, the term of this patent is extended or adjusted under 35 U.S.C. 154(b) by 126 days.

(21) Appl. No.: 11/093,374

(22) Filed: Mar. 29, 2005

(65) Prior Publication Data

US 2005/0176524 A1 Aug. 11, 2005

Related U.S. Application Data

(60) Continuation of application No. 10/413,410, filed on Apr. 14, 2003, now Pat. No. 6,905,648, which is a division of application No. 09/843,362, filed on Apr. 25, 2001, now Pat. No. 6,548,618, which is a continuation-in-part of application No. 09/562,773, filed on May 2, 2000, now Pat. No. 6,495,633, which is a continuation of application No. 09/049,410, filed on Mar. 27, 1998, now Pat. No. 6,057,403, which is a continuation-in-part of application No. 08/926,872, filed on Sep. 10, 1997, now abandoned, which is a division of application No. 08/631,613, filed on Apr. 10, 1996, now Pat. No. 5,803,831, which is a continuation-in-part of application No. 08/591,046, filed on Jan. 25, 1996, now abandoned, and a continuation-in-part of application No. 08/542,793, filed on Oct. 13, 1995, now abandoned, which is a continuation-in-part of application No. 08/070,510, filed on Jun. 1, 1993, now abandoned, application No. 11/093,374, and a continuation-in-part of application No. 08/870,585, filed on Jun. 6, 1997, now abandoned, which is a continuation of application No. 08/556,237, filed on Nov. 9, 1995, now abandoned, which is a continuation-in-part of application No. 08/542,793, filed on Oct. 13, 1995, now abandoned, which is a continuation-in-part of application No. 08/070,510, filed on Jun. 1, 1993, now abandoned.

(60) Provisional application No. 60/042,439, filed on Mar. 28, 1997.

(51) Int. Cl.
  A63B 37/06 (2006.01)
(52) U.S. Cl. ........................................................ 473/376
(58) Field of Classification Search ................ 473/376, 473/368, 373, 374
See application file for complete search history.

(56) References Cited

U.S. PATENT DOCUMENTS 2,741,480 A 4/1956 Smith (Continued)

Primary Examiner—Raeann Trimiew
(74) Attorney, Agent, or Firm—Michael A. Catania; Elaine H. Lo

(57) ABSTRACT

The present invention is directed to a golf ball comprising a dual core component, an inner cover layer and an outer cover layer. The dual core comprises an interior spherical center component formed from a thermoset material, a thermoplastic material, or combinations thereof. The dual core also comprises a core layer disposed about the center component, formed from a thermoset material, a thermoplastic material, or combinations thereof. The one or more polyurethane layers are preferably formed via a reaction injection molding (RIM) technique. The inner cover layer is relatively soft and preferably comprises an ionomer or ionomer blend. The outer cover layer is relatively hard and comprises a hard polyurethane. The resulting multi-layered golf ball of the present invention provides for enhanced distance without sacrificing playability or durability when compared to known multi-layer golf balls.

20 Claims, 3 Drawing Sheets

U.S. PATENT DOCUMENTS

| | | |
|---|---|---|
| 2,973,800 A | 3/1961 | Muccino |
| 3,053,539 A | 9/1962 | Picchowski |
| 3,264,272 A | 8/1966 | Rees |
| 3,313,545 A | 4/1967 | Bartsch |
| 3,373,123 A | 3/1968 | Brice |
| 3,384,612 A | 5/1968 | Brandt et al. |
| 3,395,109 A | 7/1968 | Molitor et al. |
| 3,458,205 A | 7/1969 | Smith et al. |
| 3,502,338 A | 3/1970 | Cox |
| 3,534,965 A | 10/1970 | Harrison et al. |
| 3,572,721 A | 3/1971 | Harrison et al. |
| 3,883,145 A | 5/1975 | Cox et al. |
| 3,979,126 A | 9/1976 | Dusbiber |
| 3,989,568 A | 11/1976 | Isaac |
| 4,076,255 A | 2/1978 | Moore et al. |
| 4,085,937 A | 4/1978 | Schenk |
| 4,123,061 A | 10/1978 | Dusbiber |
| 4,190,711 A | 2/1980 | Zdrahala et al. |
| 4,218,543 A | 8/1980 | Weber et al. |
| 4,248,432 A | 2/1981 | Hewitt et al. |
| 4,272,079 A | 6/1981 | Nakade et al. |
| 4,274,637 A | 6/1981 | Molitor |
| 4,337,946 A | 7/1982 | Saito et al. |
| 4,431,193 A | 2/1984 | Nesbitt |
| 4,442,282 A | 4/1984 | Kolycheck |
| 4,570,937 A | 2/1986 | Yamada |
| 4,582,887 A | 4/1986 | Dominguez et al. |
| 4,590,219 A | 5/1986 | Nissen et al. |
| 4,607,090 A | 8/1986 | Dominguez |
| 4,650,193 A | 3/1987 | Molitor et al. |
| 4,674,751 A | 6/1987 | Molitor et al. |
| 4,679,795 A | 7/1987 | Melvin et al. |
| 4,688,801 A | 8/1987 | Reiter |
| 4,690,981 A | 9/1987 | Statz |
| 4,695,055 A | 9/1987 | Newcomb et al. |
| 4,714,253 A | 12/1987 | Nakahara et al. |
| 4,762,322 A | 8/1988 | Molitor et al. |
| 4,798,386 A | 1/1989 | Berard |
| 4,848,770 A | 7/1989 | Shama |
| 4,852,884 A | 8/1989 | Sullivan |
| 4,858,923 A | 8/1989 | Gobush et al. |
| 4,858,924 A | 8/1989 | Saito et al. |
| 4,878,674 A | 11/1989 | Newcomb et al. |
| 4,884,814 A | 12/1989 | Sullivan |
| 4,911,451 A | 3/1990 | Sullivan et al. |
| 4,919,434 A | 4/1990 | Saito |
| 4,957,297 A | 9/1990 | Newcomb et al. |
| 4,979,746 A | 12/1990 | Gentiluomo |
| 4,984,804 A | 1/1991 | Yamada et al. |
| 4,986,545 A | 1/1991 | Sullivan |
| 5,002,281 A | 3/1991 | Nakahara et al. |
| 5,006,297 A | 4/1991 | Brown et al. |
| 5,019,319 A | 5/1991 | Nakamura et al. |
| 5,026,067 A | 6/1991 | Gentiluomo |
| 5,035,425 A | 7/1991 | Edwards |
| 5,045,591 A | 9/1991 | Meyer et al. |
| 5,048,838 A | 9/1991 | Chikaraishi et al. |
| 5,068,151 A | 11/1991 | Nakamura |
| 5,072,944 A | 12/1991 | Nakahara et al. |
| 5,096,201 A | 3/1992 | Egashira et al. |
| 5,098,105 A | 3/1992 | Sullivan |
| 5,104,126 A | 4/1992 | Gentiluomo |
| 5,120,791 A | 6/1992 | Sullivan |
| 5,142,835 A | 9/1992 | Mrocca |
| 5,150,906 A | 9/1992 | Molitor et al. |
| 5,156,405 A | 10/1992 | Kitaoh et al. |
| 5,184,828 A | 2/1993 | Kim et al. |
| 5,187,013 A | 2/1993 | Sullivan |
| 5,197,740 A | 3/1993 | Pocklington et al. |
| 5,219,973 A | 6/1993 | Slack et al. |
| 5,222,739 A | 6/1993 | Horiuchi et al. |
| 5,244,969 A | 9/1993 | Yamada |
| 5,253,871 A | 10/1993 | Viollaz |
| 5,273,286 A | 12/1993 | Sun |
| 5,273,287 A | 12/1993 | Molitor et al. |
| 5,274,041 A | 12/1993 | Yamada |
| 5,281,651 A | 1/1994 | Arjunan et al. |
| 5,300,334 A | 4/1994 | Niederst et al. |
| 5,304,608 A | 4/1994 | Yabuki et al. |
| 5,306,760 A | 4/1994 | Sullivan |
| 5,312,857 A | 5/1994 | Sullivan |
| 5,314,187 A | 5/1994 | Proudfit |
| 5,324,783 A | 6/1994 | Sullivan |
| 5,330,837 A | 7/1994 | Sullivan |
| 5,334,673 A | 8/1994 | Wu |
| 5,338,610 A | 8/1994 | Sullivan |
| 5,368,304 A | 11/1994 | Sullivan et al. |
| 5,368,806 A | 11/1994 | Harasin et al. |
| 5,387,750 A | 2/1995 | Chiang |
| 5,403,010 A | 4/1995 | Yabuki et al. |
| 5,439,227 A | 8/1995 | Egashira et al. |
| 5,480,155 A | 1/1996 | Molitor et al. |
| 5,482,285 A | 1/1996 | Yabuki et al. |
| 5,484,870 A | 1/1996 | Wu |
| 5,490,673 A | 2/1996 | Hiraoka |
| 5,490,674 A | 2/1996 | Hamada et al. |
| 5,492,972 A | 2/1996 | Stefani |
| 5,553,852 A | 9/1996 | Higuchi et al. |
| 5,586,950 A | 12/1996 | Endo |
| 5,628,699 A | 5/1997 | Maruko et al. |
| 5,668,239 A | 9/1997 | Nodelman et al. |
| 5,674,137 A | 10/1997 | Maruko et al. |
| 5,688,191 A | 11/1997 | Cavallaro et al. |
| 5,688,595 A * | 11/1997 | Yamagishi et al. ......... 428/375 |
| 5,692,974 A | 12/1997 | Wu et al. |
| 5,730,665 A | 3/1998 | Shimosaka et al. |
| 5,733,206 A | 3/1998 | Nesbitt et al. |
| 5,733,207 A | 3/1998 | Sullivan et al. |
| 5,733,428 A | 3/1998 | Calabria et al. |
| 5,739,247 A | 4/1998 | Lesko et al. |
| 5,739,253 A | 4/1998 | Nodelman et al. |
| 5,750,580 A | 5/1998 | Mayer et al. |
| 5,759,676 A | 6/1998 | Cavallaro et al. |
| 5,779,561 A | 7/1998 | Sullivan et al. |
| 5,779,562 A | 7/1998 | Melvin et al. |
| 5,779,563 A | 7/1998 | Yamagishi et al. |
| 5,783,293 A | 7/1998 | Lammi |
| 5,792,008 A | 8/1998 | Kakiuchi et al. |
| 5,797,808 A | 8/1998 | Hayashi et al. |
| 5,800,284 A | 9/1998 | Sullivan et al. |
| 5,803,831 A | 9/1998 | Sullivan et al. |
| 5,810,678 A | 9/1998 | Cavallaro et al. |
| 5,813,923 A | 9/1998 | Cavallaro et al. |
| 5,816,937 A | 10/1998 | Shimosaka et al. |
| 5,820,488 A | 10/1998 | Sullivan et al. |
| 5,820,489 A | 10/1998 | Sullivan et al. |
| 5,820,491 A | 10/1998 | Hatch et al. |
| 5,827,167 A | 10/1998 | Dougan et al. |
| 5,830,087 A | 11/1998 | Sullivan et al. |
| 5,833,553 A | 11/1998 | Sullivan et al. |
| 5,833,554 A | 11/1998 | Sullivan et al. |
| 5,836,833 A | 11/1998 | Shimosaka et al. |
| 5,849,168 A | 12/1998 | Lutz |
| 5,856,388 A | 1/1999 | Harris et al. |
| 5,863,264 A | 1/1999 | Yamagishi et al. |
| 5,873,796 A | 2/1999 | Cavallaro et al. |
| 5,885,172 A | 3/1999 | Hebert et al. |
| 5,888,437 A | 3/1999 | Calabria et al. |
| 5,891,973 A | 4/1999 | Sullivan et al. |
| 5,897,884 A | 4/1999 | Calabria et al. |
| 5,899,822 A | 5/1999 | Yamagishi et al. |
| 5,902,192 A | 5/1999 | Kashiwagi et al. |
| 5,908,358 A | 6/1999 | Wu |

| | | | | | | |
|---|---|---|---|---|---|---|
| 5,919,100 A | 7/1999 | Boehm et al. | | 5,959,059 A | 9/1999 | Vedula et al. |
| 5,919,862 A | 7/1999 | Rajagopalan et al. | | 5,976,035 A | 11/1999 | Umezawa et al. |
| 5,922,252 A | 7/1999 | Stanton et al. | | 5,980,396 A * | 11/1999 | Moriyama et al. .......... 473/376 |
| 5,929,189 A | 7/1999 | Ichikawa et al. | | 5,984,807 A | 11/1999 | Wai et al. |
| 5,935,021 A | 8/1999 | Kashiwagi et al. | | 6,548,618 B2 * | 4/2003 | Sullivan et al. ................ 528/76 |
| 5,947,842 A | 9/1999 | Cavallaro et al. | | | | |
| 5,947,843 A | 9/1999 | Calabria et al. | | * cited by examiner | | |

GOLF BALL HAVING DUAL CORE AND THIN POLYURETHANE COVER FORMED BY RIM

CROSS REFERENCES TO RELATED APPLICATIONS

The present application is a continuation application of U.S. patent application Ser. No. 10/413,410, filed on Apr. 14, 2003, now U.S. Pat. No. 6,905,648 which is a divisional application of U.S. patent application Ser. No. 09/843,362, filed on Apr. 25, 2001, now U.S. Pat. No. 6,548,618 which is a continuation-in-part of U.S. application Ser. No. 09/562,773 filed May 2, 2000, now U.S. Pat. No. 6,495,633 which is a continuation of U.S. application Ser. No. 09/049,410 filed on Mar. 27, 1998, now U.S. Pat. No. 6,057,403, which is a continuation-in-part of U.S. application Ser. No. 08/926,872 filed on Sep. 10, 1997, now abandoned which is a divisional of U.S. application Ser. No. 08/631,613 filed on Apr. 10, 1996, now U.S. Pat. No. 5,803,831 which in turn is a continuation-in-part of U.S. application Ser. No. 08/591,046 filed on Jan. 25, 1996, now abandoned and U.S. application Ser. No. 08/542,793 filed on Oct. 13, 1995, now abandoned which in turn is a continuation-in-part of U.S. application Ser. No. 08/070,510 filed Jun. 1, 1993 now abandoned. This application is also a continuation-in-part of U.S. application Ser. No. 08/870,585 filed on Jun. 6, 1997, now abandoned which is a continuation of U.S. application Ser. No. 08/556,237 filed on Nov. 9, 1995, now abandoned which is a continuation-in-part of U.S. application Ser. No. 08/542,793 filed Oct. 13, 1995, now abandoned which is a continuation-in-part of U.S. application Ser. No. 08/070,510 filed on Jun. 1, 1993 now abandoned. This application also claims priority from U.S. provisional patent Application Ser. No. 60/042,439 filed Mar. 28, 1997.

STATEMENT REGARDING FEDERALLY SPONSORED RESEARCH OR DEVELOPMENT

Not Applicable

BACKGROUND OF THE INVENTION

1. Field of the Invention

The present invention relates to golf balls and, more particularly, to improved golf balls comprising multi-layer covers which have a comparatively hard outer layer and a relatively soft inner layer, and a unique dual core configuration. The golf balls of the present invention exhibit relatively high PGA compression values. The present invention golf balls utilize one or more cover layers formed from a polyurethane material. Preferably, such polyurethane cover layers are formed from a reaction injection molding ("RIM") process. The improved multi-layer golf balls provide for enhanced distance and durability properties over single layer cover golf balls.

2. Description of the Related Art

Ionomeric resins are polymers containing interchain ionic bonding. As a result of their toughness, durability and flight characteristics, various ionomeric resins sold by E. I. DuPont de Nemours & Company under the trademark Surlyn® and more recently, by the Exxon Corporation (see U.S. Pat. No. 4,911,451) under the trademarks Escor® and Iotek®, have become the materials of choice for the construction of golf ball covers over the traditional "balata" (transpolyisoprene, natural or synthetic) rubbers. The softer balata covers, although exhibiting enhanced playability properties, lack the durability (cut and abrasion resistance, fatigue endurance, etc.) properties required for repetitive play.

Ionomeric resins are generally ionic copolymers of an olefin, such as ethylene, and a metal salt of an unsaturated carboxylic acid, such as acrylic acid, methacrylic acid, or maleic acid. Metal ions, such as sodium or zinc, are used to neutralize some portion of the acidic group in the copolymer resulting in a thermoplastic elastomer exhibiting enhanced properties, i.e. durability, etc., for golf ball cover construction over balata. However, some of the advantages gained in increased durability have been offset to some degree by the decreases produced in playability. This is because although the ionomeric resins are very durable, they tend to be very hard when utilized for golf ball cover construction, and thus lack the degree of softness required to impart the spin necessary to control the ball in flight. Since the ionomeric resins are harder than balata, the ionomeric resin covers do not compress as much against the face of the club upon impact, thereby producing less spin. In addition, the harder and more durable ionomeric resins lack the "feel" characteristic associated with the softer balata related covers.

As a result, while there are currently more than fifty (50) commercial grades of ionomers available both from DuPont and Exxon, with a wide range of properties which vary according to the type and amount of metal cations, molecular weight, composition of the base resin (i.e., relative content of ethylene and methacrylic and/or acrylic acid groups) and additive ingredients such as reinforcement agents, etc., a great deal of research continues in order to develop a golf ball cover composition exhibiting not only the improved impact resistance and carrying distance properties produced by the "hard" ionomeric resins, but also the playability (i.e., "spin," "feel," etc.) characteristics previously associated with the "soft" balata covers, properties which are still desired by the more skilled golfer.

Consequently, a number of two-piece (a solid resilient center or core with a molded cover) and three-piece (a liquid or solid center, elastomeric winding about the center, and a molded cover) golf balls have been produced to address these needs. The different types of materials utilized to formulate the cores, covers, etc. of these balls dramatically alter the balls' overall characteristics. In addition, multi-layered covers containing one or more ionomer resins have also been formulated in an attempt to produce a golf ball having the overall distance, playability and durability characteristics desired.

This was addressed by Spalding Sports Worldwide, Inc., the assignee of the present invention, in U.S. Pat. No. 4,431,193 where a multi-layered golf ball is produced by initially molding a first cover layer on a spherical core and then adding a second layer. The first layer is comprised of a hard, high flexural modulus resinous material such as type 1605 Surlyn® (now designated Surlyn® 8940). Type 1605 Surlyn® (Surlyn® 8940) is a sodium ion based low acid (less than or equal to 15 weight percent methacrylic acid) ionomer resin having a flexural modulus of about 51,000 psi. An outer layer of a comparatively soft, low flexural modulus resinous material such as type 1855 Surlyn® (now designated Surlyn® 9020) is molded over the inner cover layer. Type 1855 Surlyn® (Surlyn® 9020) is a zinc ion based low acid (10 weight percent methacrylic acid) ionomer resin having a flexural modulus of about 14,000 psi.

The '193 patent teaches that the hard, high flexural modulus resin which comprises the first layer provides for a gain in coefficient of restitution over the coefficient of restitution of the core. The increase in the coefficient of restitution provides a ball which serves to attain or approach the maximum initial velocity limit of 255 feet per second as provided by the United States Golf Association (U.S.G.A.) rules. The relatively soft, low flexural modulus outer layer provides for the advantageous "feel" and playing characteristics of a balata covered golf ball.

In various attempts to produce a durable, high spin ionomer golf ball, the golfing industry has blended the hard ionomer resins with a number of softer ionomeric resins. U.S. Pat. Nos. 4,884,814 and 5,120,791 are directed to cover compositions containing blends of hard and soft ionomeric resins. The hard copolymers typically are made from an olefin and an unsaturated carboxylic acid. The soft copolymers are generally made from an olefin, an unsaturated carboxylic acid, and an acrylate ester. It has been found that golf ball covers formed from hard-soft ionomer blends tend to become scuffed more readily than covers made of hard ionomer alone. It would be useful to develop a golf ball having a combination of softness and durability which is better than the softness-durability combination of a golf ball cover made from a hard-soft ionomer blend.

Although satisfactory in many respects, currently known golf ball constructions and the combinations of materials used therein are in need of improvement. Specifically, a need exists for alternative golf ball designs and materials that enable a wide array of properties and playability characteristics to be achieved.

These and other objects and features of the invention will be apparent from the following summary and description of the invention, the drawings and from the claims.

BRIEF SUMMARY OF THE INVENTION

The present invention provides all of the foregoing noted features and benefits, and in a first aspect, provides a golf ball comprising a center core component, a core layer disposed about the center core component, an inner cover layer disposed on the core layer, and an outer cover layer disposed on the inner cover layer. The inner cover layer has a Shore D hardness of less than 45. The outer cover layer in contrast, has a Shore D hardness of at least 50. Furthermore, the outer cover layer comprises a polyurethane material.

In yet another aspect, the present invention provides a golf ball comprising a center core component, a core layer disposed on the core center component, an inner cover layer disposed on the core layer, and an outer cover layer disposed on the inner cover layer. The inner cover layer has a thickness of from about 0.0075 inches to about 0.0225 inches. The outer cover layer similarly, has a thickness ranging from about 0.0075 inches to about 0.0225 inches. The outer cover layer comprises a polyurethane material.

In a further aspect, the present invention provides a golf ball comprising a core assembly and a multi-layer cover assembly disposed about the core assembly. The multi-layer cover assembly has a thickness of from 0.015 to 0.045 inches. The multi-layer cover assembly includes one or more cover layers that are formed from a polyurethane material.

In yet another aspect, the present invention provides a method for forming a golf ball comprising the following steps. A core center component is provided, about which is formed a core layer. An inner cover layer is formed on the core layer such that the inner cover layer has a thickness ranging from about 0.0075 inches to about 0.0225 inches. The method also involves molding an outer cover layer comprising a polyurethane material about the inner cover layer by use of a reaction injection molding technique.

In yet another aspect, the present invention provides a method of forming a golf ball having a dual core and a multi-layer cover assembly with a polyurethane cover layer via a reaction injection molding process. The method comprises the steps of providing a first material that is suitable for forming a core center component. Then a core center component is formed from that first material. A second material, different in composition than the first material, is then provided. The second material is suitable for forming a core layer. A core layer is then formed about the core center component from the second material. A dual core assembly is thereby produced. A third material is provided which is suitable for forming an inner cover layer. The method further involves the step of forming an inner cover layer about the dual core from that third material. A fourth material, different in composition than the third material, is provided. The fourth material is suitable for forming an outer cover layer. An outer cover layer is then formed on the inner cover layer from the fourth material. A multi-layer cover assembly is thereby formed. The method further involves selecting and providing the third and fourth materials such that at least one of those materials comprises a polyurethane material. Furthermore, the steps of forming the inner cover layer and the outer cover layer are performed such that the thickness of the multi-layer cover assembly is from about 0.015 inches to about 0.045 inches.

BRIEF DESCRIPTION OF SEVERAL VIEW OF THE DRAWINGS

DETAILED DESCRIPTION OF THE INVENTION

Figure 1:
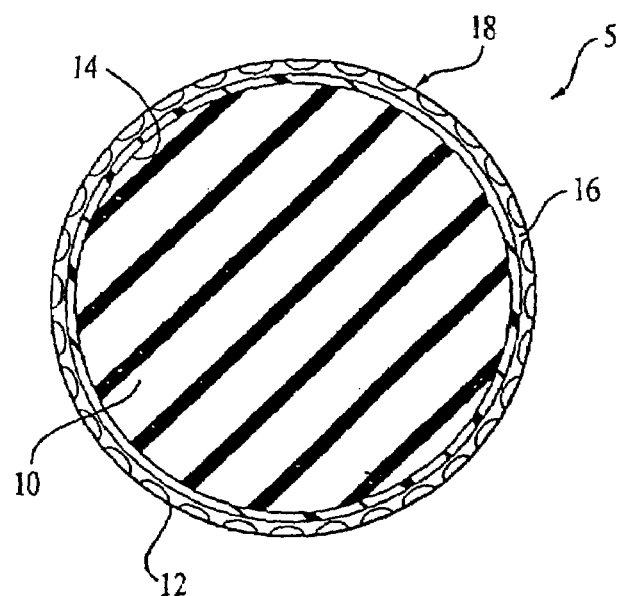
FIG. 1 is a cross-sectional view of a preferred embodiment golf ball in accordance with the present invention illustrating a core and a cover comprising an inner layer and an outer dimpled layer.

The present invention is directed to a golf ball comprising a dual-core component and a multi-layer cover. The present invention includes a variety of different embodiments as follows.

The novel multi-layer golf ball covers of the present invention include at least one polyurethane material. The multi-layer covers comprise an outer layer preferably formed from a polyurethane and may further include a high acid (greater than 16 weight percent acid) ionomer blend or, more preferably, a low acid (16 weight percent acid or less) ionomer blend. The multi-layer covers also comprise an inner layer or ply comprised of a comparatively softer, low modulus ionomer, ionomer blend or other non-ionomeric thermoplastic or thermosetting elastomer such as polyurethane or polyester elastomer. The multi-layer golf balls of the present invention can be of standard or enlarged size. Preferably, the inner layer or ply includes a blend of low acid ionomers and the outer cover layer comprises polyurethane.

The present invention golf balls utilize a unique dual-core configuration. Preferably, the cores comprise (i) an interior spherical center component formed from a thermoset material, a thermoplastic material, or combinations thereof; and (ii) a core layer disposed about the spherical center component, the core layer formed from a thermoset material, a thermoplastic material, or combinations thereof. The cores may further comprise (iii) an optional outer core layer disposed about the core layer. The outer core layer may be formed from a thermoset material, a thermoplastic material, or combinations thereof.

Although the present invention is primarily directed to golf balls comprising a dual core component and a multi-layer cover as described herein, the present invention also includes golf balls having a dual core component and conventional covers comprising balata, various thermoplastic materials, cast polyurethanes, or any other known cover materials. Furthermore, the present invention also encompasses golf balls having a dual core component and a single layer polyurethane cover formed from a RIM technique. Additionally, the present invention encompasses golf balls with solid one-piece cores and either multi-layer or single layer covers that are formed from RIM polyurethane.

It has been found that multi-layer golf balls having inner and outer cover layers exhibit higher C.O.R. values and have greater travel distance in comparison with balls made from a single cover layer. In addition, it has been found that use of an inner cover layer constructed of a blend of low acid (i.e., 16 weight percent acid or less) ionomer resins produces softer compression and higher spin rates than inner cover layers constructed of high acid ionomer resins.

Consequently, the overall combination of the unique dual core configuration, described in greater detail herein, and the multi-layer cover construction of inner and outer cover layers made, for example, from blends of low acid ionomer resins and polyurethane, results in a standard size or oversized golf ball having enhanced resilience (improved travel distance) and durability (i.e. cut resistance, etc.) characteristics while maintaining and in many instances, improving the ball's playability properties.

The combination of a low acid ionomer blend inner cover layer with a polyurethane based elastomer outer cover layer provides for good overall coefficient of restitution (i.e., enhanced resilience) while at the same time demonstrating improved compression. The polyurethane outer cover layer generally contributes to a more desirable feel.

Accordingly, the present invention is directed to a golf ball comprising a dual-core configuration and an improved multi-layer cover which produces, upon molding each layer around a core to formulate a multi-layer cover, a golf ball exhibiting enhanced distance (i.e., resilience) without adversely affecting, and in many instances, improving the ball's playability (hardness/softness) and/or durability (i.e., cut resistance, fatigue resistance, etc.) characteristics.

Figure 2:
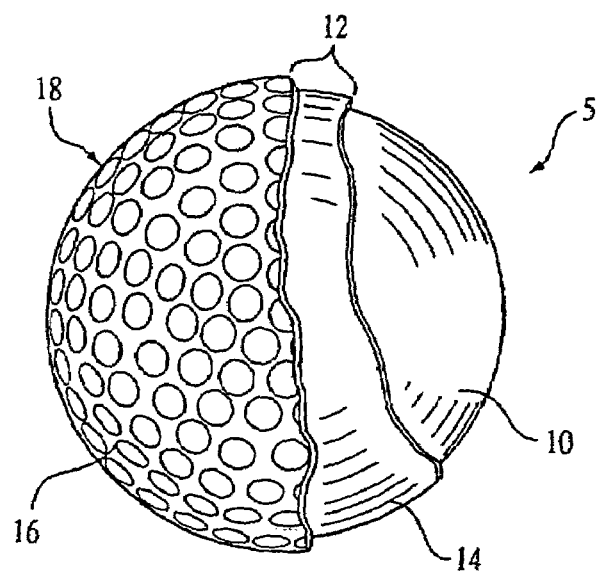
FIG. 2 is a diametrical cross-sectional view of the preferred embodiment golf ball depicted in FIG. 1 having a core and a cover comprising an inner layer surrounding the core and an outer layer having a plurality of dimples.

FIGS. 1 and 2 illustrate a preferred embodiment golf ball 5 in accordance with the present invention. It will be understood that none of the referenced figures are to scale. And so, the thicknesses and proportions of the various layers and the diameter of the various core components are not necessarily as depicted. The golf ball 5 comprises a multi-layered cover 12 disposed about a core 10. The core 10 of the golf ball can be formed of a solid, a liquid, or any other substances that may be utilized to form the novel dual core described herein. The multi-layered cover 12 comprises two layers: a first or inner layer or ply 14 and a second or outer layer or ply 16. The inner layer 14 can be comprised of ionomer, ionomer blends, non-ionomer, non-ionomer blends, or blends of ionomer and non-ionomer. The outer layer 16 is preferably harder than the inner layer and can be comprised of ionomer, ionomer blends, non-ionomer, non-ionomer blends or blends of ionomer and non-ionomer. Although the outer cover layer is preferably harder than the inner cover layer, the present invention includes cover configurations in which the outer layer is softer than the inner layer.

In a first preferred embodiment, the inner layer 14 is comprised of a high acid (i.e. greater than 16 weight percent acid) ionomer resin or high acid ionomer blend. Preferably, the inner layer is comprised of a blend of two or more high acid (i.e., at least 16 weight percent acid) ionomer resins neutralized to various extents by different metal cations. The inner cover layer may or may not include a metal stearate (e.g., zinc stearate) or other metal fatty acid salt. The purpose of the metal stearate or other metal fatty acid salt is to lower the cost of production without affecting the overall performance of the finished golf ball. In a second embodiment, the inner layer 14 is comprised of a low acid (i.e., 16 weight percent acid or less) ionomer blend. Preferably, the inner layer is comprised of a blend of two or more low acid (i.e., 16 weight percent acid or less) ionomer resins neutralized to various extents by different metal cations. The inner cover layer may or may not include a metal stearate (e.g., zinc stearate) or other metal fatty acid salt.

Two principal properties involved in golf ball performance are resilience and hardness. Resilience is determined by the coefficient of restitution (C.O.R.), the constant "e" which is the ratio of the relative velocity of two elastic spheres after direct impact to that before impact. As a result, the coefficient of restitution ("e") can vary from 0 to 1, with 1 being equivalent to an elastic collision and 0 being equivalent to an inelastic collision.

Resilience (C.O.R.), along with additional factors such as club head speed, angle of trajectory and ball configuration (i.e., dimple pattern) generally determine the distance a ball will travel when hit. Since club head speed and the angle of trajectory are factors not easily controllable by a manufacturer, factors of concern among manufacturers are the coefficient of restitution (C.O.R.) and the surface configuration of the ball.

The coefficient of restitution (C.O.R.) in solid core balls is a function of the composition of the molded core and of the cover. In balls containing a dual core (i.e., balls comprising an interior spherical center component, a core layer disposed about the spherical center component, and a cover), the coefficient of restitution is a function of not only the composition of the cover, but also the composition and physical characteristics of the interior spherical center component and core layer. Both the dual core and the cover contribute to the coefficient of restitution in the golf balls of the present invention.

In this regard, the coefficient of restitution of a golf ball is generally measured by propelling a ball at a given speed against a hard surface and measuring the ball's incoming and outgoing velocities electronically. As mentioned above, the coefficient of restitution is the ratio of the outgoing velocity to the incoming velocity. The coefficient of restitution must be carefully controlled in all commercial golf balls in order for the ball to be within the specifications regulated by the United States Golf Association (U.S.G.A.) Along this line, the U.S.G.A. standards indicate that a "regulation" ball cannot have an initial velocity (i.e., the speed off the club) exceeding 255 feet per second. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

The hardness of the ball is the second principal property involved in the performance of a golf ball. The hardness of the ball can affect the playability of the ball on striking and the sound or "click" produced. Hardness is determined by the deformation (i.e., compression) of the ball under various load conditions applied across the ball's diameter (i.e., the lower the compression value, the harder the material).

The inner cover layer is preferably softer than the outer cover layer and generally has a thickness in the range of from about 0.0075 to about 0.0225 inches, preferably 0.0125 to 0.0175 inches, and most preferably 0.015 to 0.0175 inches for a 1.68 inch ball and 0.01 to 0.10 inches for a 1.72 inch (or more) ball. The core and inner cover layer together form an inner ball having a coefficient of restitution of 0.780 or more and more preferably 0.790 or more, and a diameter in the range of 1.48 to 1.66 inches for a 1.68 inch ball and 1.50 to 1.70 inches for a 1.72 inch (or more) ball. The inner cover layer has a Shore D hardness of 50 or less. It is particularly advantageous if the golf balls of the invention have an inner layer with a Shore D hardness of 45 or less.

In one embodiment, the inner cover layer preferably is formed from an ionomer which constitutes at least 75 weight % of an acrylate ester-containing ionic copolymer or blend of acrylate ester-containing ionic copolymers. This type of inner cover layer in combination with the core results in golf ball covers having a favorable combination of durability and playability properties. The one or more acrylate ester-containing ionic copolymers each contain an olefin, an acrylate ester, and an acid. In a blend of two or more acrylate ester-containing ionic copolymers, each copolymer may contain the same or a different olefin, acrylate ester and acid than are contained in the other copolymers. Preferably, the acrylate ester-containing ionic copolymer or copolymers are terpolymers, but additional monomers can be combined into the copolymers if the monomers do not substantially reduce the scuff resistance or other good playability properties of the cover.

For a given copolymer, the olefin is selected from the group consisting of olefins having 2 to 8 carbon atoms, including, as non-limiting examples, ethylene, propylene, butene-1, hexene-1 and the like. Preferably the olefin is ethylene.

The acrylate ester is an unsaturated monomer having from 1 to 21 carbon atoms which serves as a softening comonomer. The acrylate ester preferably is methyl, ethyl, n-propyl, n-butyl, n-octyl, 2-ethylhexyl, or 2-methoxyethyl 1-acrylate, and most preferably is methyl acrylate or n-butyl acrylate. Another suitable type of softening comonomer is an alkyl vinyl ether selected from the group consisting of n-butyl, n-hexyl, 2-ethylhexyl, and 2-methoxyethyl vinyl ethers.

The acid is a mono- or dicarboxylic acid and preferably is selected from the group consisting of methacrylic, acrylic, ethacrylic, chloroacrylic, crotonic, maleic, fumaric, and itaconic acid, or the like, and half esters of maleic, fumaric and itaconic acid, or the like. The acid group of the copolymer is 10-100% neutralized with any suitable cation, for example, zinc, sodium, magnesium, lithium, potassium, calcium, manganese, nickel, chromium, tin, aluminum, or the like. It has been found that particularly good results are obtained when the neutralization level is about 50-100%.

The acrylate ester-containing ionic copolymer or copolymers used in the inner cover layer can be obtained by neutralizing commercially available acrylate ester-containing acid copolymers such as polyethylene-methyl acrylate-acrylic acid terpolymers, including Escor® ATX (Exxon Chemical Company) or poly(ethylene-butyl acrylate-methacrylic acid) terpolymers, including Nucrel® (DuPont Chemical Company). Particularly preferred commercially available materials include ATX 320, ATX 325, ATX 310, ATX 350, and blends of these materials with Nucrel® 010 and Nucrel® 035. The acid groups of these materials and blends are neutralized with one or more of various cation salts including zinc, sodium, magnesium, lithium, potassium, calcium, manganese, nickel, etc. The degree of neutralization ranges from 10-100%. Generally, a higher degree of neutralization results in a harder and tougher cover material. The properties of non-limiting examples of commercially available un-neutralized acid terpolymers which can be used to form the golf ball outer cover layers of the invention are provided below in Table 1.

TABLE 1

Properties of Un-Neutralized Acid Terpolymers

| Trade Name | Melt Index dg/min ASTM D 1238 | Acid No. % KOH/g | Flex Modulus MPa (ASTM D790) | Hardness (Shore D) |
|---|---|---|---|---|
| ATX 310 | 6 | 45 | 80 | 44 |
| ATX 320 | 5 | 45 | 50 | 34 |
| ATX 325 | 20 | 45 | 9 | 30 |
| ATX 350 | 6 | 15 | 20 | 28 |
| Nucrel ® 010 | 11 | 60 | 40 | 40 |
| Nucrel ® 035 | 35 | 60 | 59 | 40 |

The ionomer resins used to form the inner cover layers can be produced by reacting the acrylate ester-containing acid copolymer with various amounts of the metal cation salts at a temperature above the crystalline melting point of the copolymer, such as a temperature from about 200° F. to about 500° F., and preferably from about 250° F. to about 350° F., under high shear conditions at a pressure of from about 100 psi to 10,000 psi. Other well known blending techniques may also be used. The amount of metal cation salt utilized to produce the neutralized ionic copolymers is the quantity which provides a sufficient amount of the metal cations to neutralize the desired percentage of the carboxylic acid groups in the high acid copolymer. When two or more different copolymers are to be used, the copolymers can be blended before or after neutralization. Generally, it is preferable to blend the copolymers before they are neutralized to provide for optimal mixing.

The inner layer compositions may include the high acid ionomers such as those developed by E.I. DuPont de Nemours & Company under the trademark Surlyn® and by Exxon Corporation under the trademarks Escor® or Iotek®, or blends thereof. Examples of compositions which may be used as the inner layer herein are set forth in detail in a continuation of U.S. application Ser. No. 08/174,765 now abandoned, which is a continuation of U.S. application Ser. No. 07/776,803 filed Oct. 15, 1991 now abandoned, and Ser. No. 08/493,089 now issued as U.S. Pat. No. 5,688,869, which is a continuation of Ser. No. 07/981,751, which in turn is a continuation of Ser. No. 07/901,660 filed Jun. 19, 1992 now abandoned, all of which are incorporated herein by reference. Of course, the inner layer high acid ionomer compositions are not limited in any way to those compositions set forth in said applications.

The high acid ionomers which may be suitable for use in formulating the inner layer compositions are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10-100%, preferably 30-70%) by the metal ions. Each of the high acid ionomer resins which may be included in the inner layer cover compositions of the invention contains greater than about 16% by weight of a carboxylic acid, preferably from about 17% to about 25% by weight of a carboxylic acid, more preferably from about 18.5% to about 21.5% by weight of a carboxylic acid.

Although the inner layer cover composition of several embodiments of the present invention may include a high acid ionomeric resin, and the scope of the patent embraces all known high acid ionomeric resins falling within the parameters set forth above, only a relatively limited number of these high acid ionomeric resins have recently become commercially available.

The high acid ionomeric resins available from Exxon under the designation Escor® and or Iotek®, are somewhat similar to the high acid ionomeric resins available under the Surlyn® trademark. However, since the Escor®/Iotek® ionomeric resins are sodium or zinc salts of poly(ethylene-acrylic acid) and the Surlyn® resins are zinc, sodium, magnesium, etc. salts of poly(ethylene-methacrylic acid), distinct differences in properties exist.

Examples of the high acid methacrylic acid based ionomers found suitable for use in accordance with this invention include Surlyn® 8220 and 8240 (both formerly known as forms of Surlyn® AD-8422), Surlyn® 9220 (zinc cation), Surlyn® SEP-503-1 (zinc cation), and Surlyn® SEP-503-2 (magnesium cation). According to DuPont, all of these ionomers contain from about 18.5 to about 21.5% by weight methacrylic acid.

More particularly, Surlyn® AD-8422 is currently commercially available from DuPont in a number of different grades (i.e., AD-8422-2, AD-8422-3, AD-8422-5, etc.) based upon differences in melt index. According to DuPont, Surlyn® 8422, which is believed recently to have been redesignated as 8220 and 8240, offers the following general properties when compared to Surlyn® 8920, the stiffest, hardest of all on the low acid grades (referred to as "hard" ionomers in U.S. Pat. No. 4,884,814):

TABLE 2

| | LOW ACID (15 wt % Acid) | HIGH ACID (>20 wt % Acid) | |
| --- | --- | --- | --- |
| | SURLYN ® 8920 | SURLYN ® 8422-2 | SURLYN ® 8422-3 |
| IONOMER | | | |
| Cation | Na | Na | Na |
| Melt Index | 1.2 | 2.8 | 1.0 |
| Sodium, Wt % | 2.3 | 1.9 | 2.4 |
| Base Resin MI | 60 | 60 | 60 |
| MP[1], ° C. | 88 | 86 | 85 |
| FP[1], ° C. | 47 | 48.5 | 45 |
| COMPRESSION MOLDING[2] | | | |
| Tensile Break, psi | 4350 | 4190 | 5330 |
| Yield, psi | 2880 | 3670 | 3590 |
| Elongation, % | 315 | 263 | 289 |
| Flex Mod, K psi | 53.2 | 76.4 | 88.3 |
| Shore D hardness | 66 | 67 | 68 |

[1]DSC second heat, 10° C./min heating rate.
[2]Samples compression molded at 150° C. annealed 24 hours at 60° C. 8422-2, -3 were homogenized at 190° C. before molding.

In comparing Surlyn® 8920 to Surlyn® 8422-2 and Surlyn® 8422-3, it is noted that the high acid Surlyn® 8422-2 and 8422-3 ionomers have a higher tensile yield, lower elongation, slightly higher Shore D hardness and much higher flexural modulus. Surlyn® 8920 contains 15 weight percent methacrylic acid and is 59% neutralized with sodium.

In addition, Surlyn® SEP-503-1 (zinc cation) and Surlyn® SEP-503-2 (magnesium cation) are high acid zinc and magnesium versions of the Surlyn® AD 8422 high acid ionomers. When compared to the Surlyn® AD 8422 high acid ionomers, the Surlyn® SEP-503-1 and SEP-503-2 ionomers can be defined as follows:

TABLE 3

| Surlyn ® Ionomer | Ion | Melt Index | Neutralization % |
| --- | --- | --- | --- |
| AD 8422-3 | Na | 1.0 | 45 |
| SEP 503-1 | Zn | 0.8 | 38 |
| SEP 503-2 | Mg | 1.8 | 43 |

Further, Surlyn® 8162 is a zinc cation ionomer resin containing approximately 20% by weight (i.e., 18.5-21.5% weight) methacrylic acid copolymer that has been 30-70% neutralized. Surlyn® 8162 is currently commercially available from DuPont.

Examples of the high acid acrylic acid based ionomers suitable for use in the present invention also include the Escor® or Iotek® high acid ethylene acrylic acid ionomers produced by Exxon such as Ex 1001, 1002, 959, 960, 989, 990, 1003, 1004, 993, 994. In this regard, Escor® or Iotek® 959 is a sodium ion neutralized ethylene-acrylic neutralized ethylene-acrylic acid copolymer. According to Exxon, Iotek® 959 and 960 contain from about 19.0 to 21.0% by weight acrylic acid with approximately 30 to about 70 percent of the acid groups neutralized with sodium and zinc ions, respectively. The physical properties of these high acid acrylic acid based ionomers are set forth in Tables 4 and 5 as follows:

TABLE 4

Physical Properties of Various Ionomers

| PROPERTY | Ex1001 | Ex1002 | ESCOR ® (IOTEK ®) 959 | Ex1003 | Ex1004 | ESCOR ® (IOTEK ®) 960 |
|---|---|---|---|---|---|---|
| Melt index, g/10 min | 1.0 | 1.6 | 2.0 | 1.1 | 2.0 | 1.8 |
| Cation | Na | Na | Na | Zn | Zn | Zn |
| Melting Point, ° F. | 183 | 183 | 172 | 180 | 180.5 | 174 |
| Vicat Softening Point, ° F. | 125 | 125 | 130 | 133 | 131 | 131 |
| Tensile @ Break | 34.4 MPa | 22.5 MPa | 4600 psi | 24.8 MPa | 20.6 MPa | 3500 psi |
| Elongation @ Break, % | 341 | 348 | 325 | 387 | 437 | 430 |
| Hardness, Shore D | 63 | 62 | 66 | 54 | 53 | 57 |
| Flexural Modulus | 365 MPa | 380 MPa | 66,000 psi | 147 MPa | 130 MPa | 27,000 psi |

TABLE 5

Physical Properties of Various Ionomers

| | | EX 989 | EX 993 | EX 994 | EX 990 |
|---|---|---|---|---|---|
| Melt index | g/10 min | 1.30 | 1.25 | 1.32 | 1.24 |
| Moisture | ppm | 482 | 214 | 997 | 654 |
| Cation type | — | Na | Li | K | Zn |
| M+ content by AAS | wt % | 2.74 | 0.87 | 4.54 | 0 |
| Zn content by AAS | wt % | 0 | 0 | 0 | 3.16 |
| Density | kg/m³ | 959 | 945 | 976 | 977 |
| Vicat softening point | ° C. | 52.5 | 51 | 50 | 55.0 |
| Crystallization point | ° C. | 40.1 | 39.8 | 44.9 | 54.4 |
| Melting point | ° C. | 82.6 | 81.0 | 80.4 | 81.0 |
| Tensile at yield | MPa | 23.8 | 24.6 | 22 | 16.5 |
| Tensile at break | MPa | 32.3 | 31.1 | 29.7 | 23.8 |
| Elongation at break | % | 330 | 260 | 340 | 357 |
| 1% secant modulus | MPa | 389 | 379 | 312 | 205 |
| Flexural modulus | MPa | 340 | 368 | 303 | 183 |
| Abrasion resistance | mg | 20.0 | 9.2 | 15.2 | 20.5 |
| Hardness Shore D | — | 62 | 62.5 | 61 | 56 |
| Zwick Rebound | % | 61 | 63 | 59 | 48 |

Furthermore, as a result of the development by the assignee of this application of a number of new high acid ionomers neutralized to various extents by several different types of metal cations, such as by manganese, lithium, potassium, calcium and nickel cations, several new high acid ionomers and/or high acid ionomer blends besides sodium, zinc and magnesium high acid ionomers or ionomer blends are now available for golf ball cover production. It has been found that these new cation neutralized high acid ionomer blends produce inner cover layer compositions exhibiting enhanced hardness and resilience due to synergies which occur during processing. Consequently, the metal cation neutralized high acid ionomer resins recently produced can be blended to produce substantially higher C.O.R.'s than those produced by the low acid ionomer inner cover compositions presently commercially available.

More particularly, several new metal cation neutralized high acid ionomer resins have been produced by neutralizing, to various extents, high acid copolymers of an alpha-olefin and an alpha, beta-unsaturated carboxylic acid with a wide variety of different metal cation salts. This discovery is the subject matter of U.S. Pat. No. 5,688,869, incorporated herein by reference. It has been found that numerous new metal cation neutralized high acid ionomer resins can be obtained by reacting a high acid copolymer (i.e., a copolymer containing greater than 16% by weight acid, preferably from about 17 to about 25 weight percent acid, and more preferably about 20 weight percent acid), with a metal cation salt capable of ionizing or neutralizing the copolymer to the extent desired (i.e., from about 10% to 90%).

The base copolymer is made up of greater than 16% by weight of an alpha, beta-unsaturated carboxylic acid and an alpha-olefin. Optionally, a softening comonomer can be included in the copolymer. Generally, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid being preferred.

The softening comonomer that can be optionally included in the inner cover layer for the golf ball of the invention may be selected from the group consisting of vinyl esters of aliphatic carboxylic acids wherein the acids have 2 to 10 carbon atoms, vinyl ethers wherein the alkyl groups contains 1 to 10 carbon atoms, and alkyl acrylates or methacrylates wherein the alkyl group contains 1 to 10 carbon atoms. Suitable softening comonomers include vinyl acetate, methyl acrylate, methyl methacrylate, ethyl acrylate, ethyl methacrylate, butyl acrylate, butyl methacrylate, or the like.

Consequently, examples of a number of copolymers suitable for use to produce the high acid ionomers included in the present invention include, but are not limited to, high acid embodiments of an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, etc. The base copolymer broadly contains greater than 16% by weight unsaturated carboxylic acid, from about 39 to about 83% by weight ethylene and from 0 to about 40% by weight of a softening comonomer. Preferably, the copolymer contains about 20% by weight unsaturated carboxylic acid and about 80% by weight ethylene. Most preferably, the copolymer contains about 20% acrylic acid with the remainder being ethylene.

Along these lines, examples of the preferred high acid base copolymers which fulfill the criteria set forth above, are a series of ethylene-acrylic copolymers which are commercially available from The Dow Chemical Company, Midland, Mich., under the Primacor® designation. These high acid base copolymers exhibit the typical properties set forth below in Table 6.

TABLE 6

Typical Properties of Primacor® Ethylene-Acrylic Acid Copolymers

| GRADE | PERCENT ACID | DENSITY, g/cc | MELT INDEX, g/10 min | TENSILE YD. ST (psi) | FLEXURAL MODULUS (psi) | VICAT SOFT PT (° C.) | SHORE D HARDNESS |
|---|---|---|---|---|---|---|---|
| ASTM |  | D-792 | D-1238 | D-638 | D-790 | D-1525 | D-2240 |
| 5980 | 20.0 | 0.958 | 300.0 | — | 4800 | 43 | 50 |
| 5990 | 20.0 | 0.955 | 1300.0 | 650 | 3200 | 40 | 42 |
| 5981 | 20.0 | 0.960 | 300.0 | 900 | 3200 | 46 | 48 |
| 5983 | 20.0 | 0.958 | 500.0 | 850 | 3100 | 44 | 45 |
| 5991 | 20.0 | 0.953 | 2600.0 | 635 | 2600 | 38 | 40 |

[1] The Melt Index values are obtained according to ASTM D-1238, at 190° C.

Due to the high molecular weight of the Primacor® 5981 grade of the ethylene-acrylic acid copolymer, this copolymer is the more preferred grade utilized in the invention.

The metal cation salts utilized in the invention are those salts which provide the metal cations capable of neutralizing, to various extents, the carboxylic acid groups of the high acid copolymer. These include acetate, oxide or hydroxide salts of lithium, calcium, zinc, sodium, potassium, nickel, magnesium, and manganese.

Examples of such lithium ion sources are lithium hydroxide monohydrate, lithium hydroxide, lithium oxide and lithium acetate. Sources for the calcium ion include calcium hydroxide, calcium acetate and calcium oxide. Suitable zinc ion sources are zinc acetate dihydrate and zinc acetate, a blend of zinc oxide and acetic acid. Examples of sodium ion sources are sodium hydroxide and sodium acetate. Sources for the potassium ion include potassium hydroxide and potassium acetate. Suitable nickel ion sources are nickel acetate, nickel oxide and nickel hydroxide. Sources of magnesium include magnesium oxide, magnesium hydroxide, and magnesium acetate. Sources of manganese include manganese acetate and manganese oxide.

The new metal cation neutralized high acid ionomer resins are produced by reacting the high acid base copolymer with various amounts of the metal cation salts above the crystalline melting point of the copolymer, such as at a temperature from about 200° F. to about 500° F., preferably from about 250° F. to about 350° F. under high shear conditions at a pressure of from about 10 psi to 10,000 psi. Other well known blending techniques may also be used. The amount of metal cation salt utilized to produce the new metal cation neutralized high acid based ionomer resins is the quantity which provides a sufficient amount of the metal cations to neutralize the desired percentage of the carboxylic acid groups in the high acid copolymer. The extent of neutralization is generally from about 10% to about 90%.

As indicated below in Table 7 and more specifically in Example 1 in U.S. Pat. No. 5,688,869, a number of new types of metal cation neutralized high acid ionomers can be obtained from the above indicated process. These include new high acid ionomer resins neutralized to various extents with manganese, lithium, potassium, calcium and nickel cations. In addition, when a high acid ethylene/acrylic acid copolymer is utilized as the base copolymer component of the invention and this component is subsequently neutralized to various extents with the metal cation salts producing acrylic acid based high acid ionomer resins neutralized with cations such as sodium, potassium, lithium, zinc, magnesium, manganese, calcium and nickel, several new cation neutralized acrylic acid based high acid ionomer resins are produced.

TABLE 7

Metal Cation Neutralized High Acid Ionomers

| Formulation No. | Wt-% Cation Salt | Wt-% Neutralization | Melt Index | C.O.R. | Shore D Hardness |
|---|---|---|---|---|---|
| 1(NaOH) | 6.98 | 67.5 | 0.9 | .804 | 71 |
| 2(NaOH) | 5.66 | 54.0 | 2.4 | .808 | 73 |
| 3(NaOH) | 3.84 | 35.9 | 12.2 | .812 | 69 |
| 4(NaOH) | 2.91 | 27.0 | 17.5 | .812 | (brittle) |
| 5(MnAc) | 19.6 | 71.7 | 7.5 | .809 | 73 |
| 6(MnAc) | 23.1 | 88.3 | 3.5 | .814 | 77 |
| 7(MnAc) | 15.3 | 53.0 | 7.5 | .810 | 72 |
| 8(MnAc) | 26.5 | 106 | 0.7 | .813 | (brittle) |
| 9(LiOH) | 4.54 | 71.3 | 0.6 | .810 | 74 |
| 10(LiOH) | 3.38 | 52.5 | 4.2 | .818 | 72 |
| 11(LiOH) | 2.34 | 35.9 | 18.6 | .815 | 72 |
| 12(KOH) | 5.30 | 36.0 | 19.3 | Broke | 70 |
| 13(KOH) | 8.26 | 57.9 | 7.18 | .804 | 70 |
| 14(KOH) | 10.7 | 77.0 | 4.3 | .801 | 67 |
| 15(ZnAc) | 17.9 | 71.5 | 0.2 | .806 | 71 |
| 16(ZnAc) | 13.9 | 53.0 | 0.9 | .797 | 69 |
| 17(ZnAc) | 9.91 | 36.1 | 3.4 | .793 | 67 |
| 18(MgAc) | 17.4 | 70.7 | 2.8 | .814 | 74 |
| 19(MgAc) | 20.6 | 87.1 | 1.5 | .815 | 76 |
| 20(MgAc) | 13.8 | 53.8 | 4.1 | .814 | 74 |
| 21(CaAc) | 13.2 | 69.2 | 1.1 | .813 | 74 |
| 22(CaAc) | 7.12 | 34.9 | 10.1 | .808 | 70 |

Controls: 50/50 Blend of Ioteks® 8000/7030 C.O.R. = .810/65 Shore D Hardness
DuPont High Acid Surlyn® 8422 (Na) C.O.R. = .811/70 Shore D Hardness
DuPont High Acid Surlyn® 8162 (Zn) C.O.R. = .807/65 Shore D Hardness
Exxon High Acid Iotek® EX-960 (Zn) C.O.R. = .796/65 Shore D Hardness

| Formulation No. | Wt-% Cation Salt | Wt-% Neutralization | Melt Index | C.O.R. |
|---|---|---|---|---|
| 23(MgO) | 2.91 | 53.5 | 2.5 | .813 |
| 24(MgO) | 3.85 | 71.5 | 2.8 | .808 |
| 25(MgO) | 4.76 | 89.3 | 1.1 | .809 |
| 26(MgO) | 1.96 | 35.7 | 7.5 | .815 |

Control for Formulations 23–26 is 50/50 Iotek® 8000/7030, C.O.R. = .814, Formulation 26 C.O.R. was normalized to that control accordingly

| Formulation No. | Wt-% Cation Salt | Wt-% Neutralization | Melt Index | C.O.R. | Shore D Hardness |
|---|---|---|---|---|---|
| 27(NiAc) | 13.04 | 61.1 | 0.2 | .802 | 71 |
| 28(NiAc) | 10.71 | 48.9 | 0.5 | .799 | 72 |

TABLE 7-continued

Metal Cation Neutralized High Acid Ionomers

| | | | | | |
|---|---|---|---|---|---|
| 29(NiAc) | 8.26 | 36.7 | 1.8 | .796 | 69 |
| 30(NiAc) | 5.66 | 24.4 | 7.5 | .786 | 64 |

Control for Formulation Nos. 27–30 is 50/50 Iotek® 8000/7030, C.O.R. = .807

When compared to low acid versions of similar cation neutralized ionomer resins, the new metal cation neutralized high acid ionomer resins exhibit enhanced hardness, modulus and resilience characteristics. These are properties that are particularly desirable in a number of thermoplastic fields, including the field of golf ball manufacturing.

When utilized in the construction of the inner layer of a multi-layered golf ball, it has been found that the new acrylic acid based high acid ionomers extend the range of hardness beyond that previously obtainable while maintaining the beneficial properties (i.e. durability, click, feel, etc.) of the softer low acid ionomer covered balls, such as balls produced utilizing the low acid ionomers disclosed in U.S. Pat. Nos. 4,884,814 and 4,911,451. Moreover, as a result of the development of a number of new acrylic acid based high acid ionomer resins neutralized to various extents by several different types of metal cations, such as manganese, lithium, potassium, calcium and nickel cations, several new ionomers or ionomer blends are now available for production of an inner cover layer of a multi-layered golf ball. By using these high acid ionomer resins, harder, stiffer inner cover layers having higher C.O.R.s, and thus longer distance, can be obtained.

More preferably, it has been found that when two or more of the above-indicated high acid ionomers, particularly blends of sodium and zinc high acid ionomers, are processed to produce the covers of multi-layered golf balls, (i.e., the inner cover layer herein) the resulting golf balls will travel further than previously known multi-layered golf balls produced with low acid ionomer resin covers due to the balls' enhanced coefficient of restitution values.

The low acid ionomers which may be suitable for use in formulating the inner layer compositions of several of the embodiments of the subject invention are ionic copolymers which are the metal, i.e., sodium, zinc, magnesium, etc., salts of the reaction product of an olefin having from about 2 to 8 carbon atoms and an unsaturated monocarboxylic acid having from about 3 to 8 carbon atoms. Preferably, the ionomeric resins are copolymers of ethylene and either acrylic or methacrylic acid. In some circumstances, an additional comonomer such as an acrylate ester (i.e., iso- or n-butylacrylate, etc.) can also be included to produce a softer terpolymer. The carboxylic acid groups of the copolymer are partially neutralized (i.e., approximately 10-100%, preferably 30-70%) by the metal ions. Each of the low acid ionomer resins which may be included in the inner layer cover compositions of the invention contains 16% by weight or less of a carboxylic acid.

The inner layer compositions include the low acid ionomers such as those developed and sold by E.I. DuPont de Nemours & Company under the trademark Surlyn® and by Exxon Corporation under the trademark Escor® or Iotek®, or blends thereof.

The low acid ionomer resins available from Exxon under the designation Escor® and/or Iotek®, are somewhat similar to the low acid ionomeric resins available under the Surlyn® trademark. However, since the Escor®/Iotek® ionomeric resins are sodium or zinc salts of poly(ethylene-acrylic acid) and the Surlyn® resins are zinc, sodium, magnesium, etc. salts of poly(ethylene-methacrylic acid), distinct differences in properties exist.

When utilized in the construction of the inner layer of a multi-layered golf ball, it has been found that the low acid ionomer blends extend the range of compression and spin rates beyond that previously obtainable. More preferably, it has been found that when two or more low acid ionomers, particularly blends of sodium and zinc ionomers, are processed to produce the covers of multi-layered golf balls, (i.e., the inner cover layer herein) the resulting golf balls will travel further and at an enhanced spin rate than previously known multi-layered golf balls. Such an improvement is particularly noticeable in enlarged or oversized golf balls.

The use of an inner layer formulated from blends of lower acid ionomers produces multi-layer golf balls having enhanced compression and spin rates. These are the properties desired by the more skilled golfer.

In yet another embodiment of the inner cover layer, a blend of high and low acid ionomer resins is used. These can be the ionomer resins described above, combined in a weight ratio which preferably is within the range of 10:90 to 90:10 parts of high and low acid ionomer resins.

A further additional embodiment of the inner cover layer is primarily based upon the use of a fully non-ionomeric thermoplastic material. Suitable non-ionomeric materials include metallocene catalyzed polyolefins or polyamides, polyamide/ionomer blends, polyphenylene ether/ionomer blends, etc., which have hardness and flex modulus values which are comparable to the properties of the ionomers described above. Other suitable materials include but are not limited to thermoplastic or thermosetting polyurethanes, a polyester elastomer such as that marketed by DuPont under the trademark Hytrel®, or a polyether amide such as that marketed by Elf Atochem S.A. under the trademark Pebax®, a blend of two or more non-ionomeric thermoplastic elastomers, or a blend of one or more ionomers and one or more non-ionomeric thermoplastic elastomers. These materials can be blended with the ionomers described above in order to reduce cost relative to the use of higher quantities of ionomer.

The inner layer in another embodiment of the invention includes a blend of a soft (low acid) ionomer resin with a small amount of a hard (high acid) ionomer resin. A low modulus ionomer suitable for use in the outer layer blend has a flexural modulus measuring from about 1,000 to about 10,000 psi, with a hardness of about 20 to about 40 on the Shore D scale. A high modulus ionomer herein is one which measures from about 15,000 to about 70,000 psi as measured in accordance with ASTM method D-790. The hardness may be defined as at least about 40 on the Shore D scale as measured in accordance with ASTM method D-2240.

Soft ionomers primarily are used in formulating the hard/soft blends of the cover compositions. These ionomers include acrylic acid and methacrylic acid based soft ionomers. They are generally characterized as comprising sodium, zinc, or other mono- or divalent metal cation salts of a terpolymer of an olefin having from about 2 to 8 carbon atoms, methacrylic acid, acrylic acid, or another alpha,beta-unsaturated carboxylic acid, and an unsaturated monomer of the acrylate ester class having from 1 to 21 carbon atoms. The soft ionomer is preferably made from an acrylic acid base polymer and is an unsaturated monomer of the acrylate ester class.

Certain ethylene-acrylic acid based soft ionomer resins developed by the Exxon Corporation under the designation Iotek® 7520 (referred to experimentally by differences in neutralization and melt indexes as LDX 195, LDX 196, LDX 218 and LDX 219) may be combined with known hard ionomers such as those indicated above to produce the inner and outer cover layers. The combination produces higher C.O.R.s at equal or softer hardness, higher melt flow (which corresponds to improved, more efficient molding, i.e., fewer rejects) as well as significant cost savings versus the outer layer of multi-layer balls produced by other known hard-soft ionomer blends as a result of the lower overall raw materials cost and improved yields.

While the exact chemical composition of the resins to be sold by Exxon under the designation Iotek® 7520 is considered by Exxon to be confidential and proprietary information, Exxon's experimental product data sheet lists the following physical properties of the ethylene acrylic acid zinc ionomer developed by Exxon:

TABLE 8

| Property Value | ASTM Method | Units | Typical |
|---|---|---|---|
| Physical Properties of Iotek ® 7520 | | | |
| Melt Index | D-1238 | g/10 min. | 2 |
| Density | D-1505 | kg/m³ | 0.962 |
| Cation | | | Zinc |
| Melting Point | D-3417 | ° C. | 66 |
| Crystallization Point | D-3417 | ° C. | 49 |
| Vicat Softening Point | D-1525 | ° C. | 42 |
| Plaque Properties (2 mm thick Compression Molded Plaques) | | | |
| Tensile at Break | D-638 | MPa | 10 |
| Yield Point | D-638 | MPa | None |
| Elongation at Break | D-638 | % | 760 |
| 1% Secant Modulus | D-638 | MPa | 22 |
| Shore D Hardness | D-2240 | | 32 |
| Flexural Modulus | D-790 | MPa | 26 |
| Zwick Rebound | ISO 4862 | % | 52 |
| De Mattia Flex Resistance | D-430 | Cycles | >5000 |

In addition, test data collected by the inventors indicates that Iotek® 7520 resins have Shore D hardnesses of about 32 to 36 (per ASTM D-2240), melt flow indexes of 3±0.5 g/10 min (at 190° C. per ASTM D-1288), and a flexural modulus of about 2500-3500 psi (per ASTM D-790). Furthermore, testing by an independent testing laboratory by pyrolysis mass spectrometry indicates at Iotek® 7520 resins are generally zinc salts of a terpolymer of ethylene, acrylic acid, and methyl acrylate.

Furthermore, the inventors have found that a grade of an acrylic acid based soft ionomer available from the Exxon Corporation under the designation Iotek® 7510 is also effective when combined with the hard ionomers indicated above in producing golf ball covers exhibiting higher C.O.R. values at equal or softer hardness than those produced by known hard-soft ionomer blends. In this regard, Iotek® 7510 has the advantages (i.e. improved flow, higher C.O.R. values at equal hardness, increased clarity, etc.) produced by the Iotek® 7520 resin when compared to the methacrylic acid base soft ionomers known in the art (such as the Surlyn® 8625 and Surlyn® 8629 combinations disclosed in U.S. Pat. No. 4,884,814).

In addition, Iotek® 7510, when compared to Iotek® 7520, produces slightly higher C.O.R. values at equal softness/hardness due to the Iotek® 7510's higher hardness and neutralization. Similarly, Iotek® 7510 produces better release properties (from the mold cavities) due to its slightly higher stiffness and lower flow rate than Iotek® 7520. This is important in production where the soft covered balls tend to have lower yields caused by sticking in the molds and subsequent punched pin marks from the knockouts.

According to Exxon, Iotek® 7510 is of similar chemical composition as Iotek® 7520 (i.e. a zinc salt of a terpolymer of ethylene, acrylic acid, and methyl acrylate) but is more highly neutralized. Based upon FTIR analysis, Iotek® 7520 is estimated to be about 30-40 wt.-% neutralized and Iotek® 7510 is estimated to be about 40-60 wt.-% neutralized. The typical properties of Iotek® 7510 in comparison of those of Iotek® 7520 in comparison of those of Iotek® 7520 are set forth below:

TABLE 9

Physical Properties of Iotek ® 7510 in Comparison to Iotek ® 7520

| | IOTEK ® 7520 | IOTEK ® 7510 |
|---|---|---|
| MI, g/10 min | 2.0 | 0.8 |
| Density, g/cc | 0.96 | 0.97 |
| Melting Point, ° F. | 151 | 149 |
| Vicat Softening Point, ° F. | 108 | 109 |
| Flex Modulus, psi | 3800 | 5300 |
| Tensile Strength, psi | 1450 | 1750 |
| Elongation, % | 760 | 690 |
| Hardness, Shore D | 32 | 35 |

The hard ionomer resins utilized to produce the inner cover layer composition hard/soft blends include ionic copolymers which are the sodium, zinc, magnesium, lithium, etc. salts of the reaction product of an olefin having from 2 to 8 carbon atoms and an unsaturated monocarboxylic acid having from 3 to 8 carbon atoms. The carboxylic acid groups of the copolymer may be totally or partially (i.e. approximately 15-75 percent) neutralized.

The hard ionomeric resins are likely copolymers of ethylene and acrylic and/or methacrylic acid, with copolymers of ethylene and acrylic acid being the most preferred. Two or more types of hard ionomeric resins may be blended into the outer cover layer compositions in order to produce the desired properties of the resulting golf balls.

As discussed earlier herein, the hard ionomeric resins introduced under the designation Escor® and sold under the designation Iotek® are somewhat similar to the hard ionomeric resins sold under the Surlyn® trademark. However, since the Iotek® ionomeric resins are sodium or zinc salts of poly(ethylene-acrylic acid) and the Surlyn® resins are zinc or sodium salts of poly(ethylene-methacrylic acid) some distinct differences in properties exist. As more specifically indicated in the data set forth below, the hard Iotek® resins (i.e., the acrylic acid based hard ionomer resins) are the more preferred hard resins for use in formulating the outer layer blends for use in the present invention. In addition, various blends of Iotek® and Surlyn® hard ionomeric resins, as well as other available ionomeric resins, may be utilized in the present invention in a similar manner.

Examples of commercially available hard ionomeric resins which may be used in the present invention in formulating the inner cover blends include the hard sodium ionic copolymer sold under the trademark Surlyn® 8940 and the hard zinc ionic copolymer sold under the trademark Surlyn® 9910. Surlyn® 8940 is a copolymer of ethylene with methacrylic acid and about 15 weight percent acid which is about 29 percent neutralized with sodium ions. This resin has an average melt flow index of about 2.8 g/10 min. Surlyn® 9910 is a copolymer of ethylene and methacrylic acid with about 15 weight percent acid which is about 58 percent neutralized with zinc ions. The average melt flow index of Surlyn® 9910 is about 0.7 g/10 min. The typical properties of Surlyn® 9910 and 8940 are set forth below in Table 10:

TABLE 10

Typical Properties of Commercially Available Hard Surlyn ® Resins
Suitable for Use in the Cover Layer Blends of the Present Invention

|  | ASTM D | 8940 | 9910 | 8920 | 8528 | 9970 | 9730 |
|---|---|---|---|---|---|---|---|
| Cation Type |  | Sodium | Zinc | Sodium | Sodium | Zinc | Zinc |
| Melt flow index, gms/10 min. | D-1238 | 2.8 | 0.7 | 0.9 | 1.3 | 14.0 | 1.6 |
| Specific Gravity, g/cm$^3$ | D-792 | 0.95 | 0.97 | 0.95 | 0.94 | 0.95 | 0.95 |
| Hardness, Shore D | D-2240 | 66 | 64 | 66 | 60 | 62 | 63 |
| Tensile Strength, (kpsi), MPa | D-638 | (4.8) 33.1 | (3.6) 24.8 | (5.4) 37.2 | (4.2) 29.0 | (3.2) 22.0 | (4.1) 28.0 |
| Elongation, % | D-638 | 470 | 290 | 350 | 450 | 460 | 460 |
| Flexural Modulus, (kpsi) MPa | D-790 | (51) 350 | (48) 330 | (55) 380 | (32) 220 | (28) 190 | (30) 210 |
| Tensile Impact (23° C.) KJ/m$_2$ (ft.-lbs./in$^2$) | D-1822S | 1020 (485) | 1020 (485) | 865 (410) | 1160 (550) | 760 (360) | 1240 (590) |
| Vicat Temperature, ° C. | D-1525 | 63 | 62 | 58 | 73 | 61 | 73 |

Examples of the more pertinent acrylic acid based hard ionomer resin suitable for use in the present inner cover composition sold under the Iotek® trade mark by the Exxon Corporation include Iotek® 8000, 8010, 8020, 8030, 7030, 7010, 7020, 1002, 1003, 959 and 960. The physical properties of Iotek® 959 and 960 are shown above. The typical properties of the remainder of these and other Iotek® hard ionomers suited for use in formulating the inner layer cover composition are set forth below in Table 11:

TABLE 11

Typical Properties of Iotek ® Ionomers

|  | ASTM Method | Units | 4000 | 4010 | 8000 | 8020 | 8030 |
|---|---|---|---|---|---|---|---|
| Resin Properties |  |  |  |  |  |  |  |
| Cation type |  |  | zinc | zinc | sodium | sodium | sodium |
| Melt index | D-1238 | g/10 min. | 2.5 | 1.5 | 0.8 | 1.6 | 2.8 |
| Density | D-1505 | kg/m$^3$ | 963 | 963 | 954 | 960 | 960 |
| Melting Point | D-3417 | ° C. | 90 | 90 | 90 | 87.5 | 87.5 |
| Crystallization Point | D-3417 | ° C. | 62 | 64 | 56 | 53 | 55 |
| Vicat Softening Point | D-1525 | ° C. | 62 | 63 | 61 | 64 | 67 |
| % Weight Acrylic Acid |  |  |  |  | 16 | 11 |  |
| % of Acid Groups cation neutralized |  |  |  |  | 30 | 40 |  |
| Plaque Properties (3 mm thick, compression molded) |  |  |  |  |  |  |  |
| Tensile at break | D-638 | MPa | 24 | 26 | 36 | 31.5 | 28 |
| Yield point | D-638 | MPa | none | none | 21 | 21 | 23 |
| Elongation at break | D-638 | % | 395 | 420 | 350 | 410 | 395 |
| 1% Secant modulus | D-638 | MPa | 160 | 160 | 300 | 350 | 390 |
| Shore D Hardness | D-2240 | — | 55 | 55 | 61 | 58 | 59 |
| Film Properties (50 micron film 2.2:1 Blow-up ratio) Tensile at Break |  |  |  |  |  |  |  |
| MD | D-882 | MPa | 41 | 39 | 42 | 52 | 47.4 |
| TD | D-882 | MPa | 37 | 38 | 38 | 38 | 40.5 |
| Yield point |  |  |  |  |  |  |  |
| MD | D-882 | MPa | 15 | 17 | 17 | 23 | 21.6 |
| TD | D-882 | MPa | 14 | 15 | 15 | 21 | 20.7 |

TABLE 11-continued

Typical Properties of Iotek ® Ionomers

| Elongation at Break | | | | | | | |
|---|---|---|---|---|---|---|---|
| MD | D-882 | % | 310 | 270 | 260 | 295 | 305 |
| TD | D-882 | % | 360 | 340 | 280 | 340 | 345 |
| 1% Secant modulus | | | | | | | |
| MD | D-882 | MPa | 210 | 215 | 390 | 380 | 380 |
| TD | D-882 | MPa | 200 | 225 | 380 | 350 | 345 |
| Dart Drop Impact | D-1709 | g/micron | | | 12.4 | 12.5 | 203 |

| | ASTM Method | Units | 7010 | 7020 | 7030 |
|---|---|---|---|---|---|
| Resin Properties | | | | | |
| Cation type | | | zinc | zinc | zinc |
| Melt Index | D-1238 | g/10 min. | 0.8 | 1.5 | 2.5 |
| Density | D-1505 | kg/m³ | 960 | 960 | 960 |
| Melting Point | D-3417 | ° C. | 90 | 90 | 90 |
| Vicat Softening Point | D-1525 | ° C. | 60 | 63 | 625 |
| Plaque Properties (3 mm thick, compression molded) | | | | | |
| Tensile at break | D-638 | MPa | 38 | 38 | 38 |
| Yield Point | D-638 | MPa | none | none | none |
| Elongation at break | D-638 | % | 500 | 420 | 395 |
| Shore Hardness D | D-2240 | — | 57 | 55 | 55 |

It has been determined that when hard/soft ionomer blends are used for the inner cover layer, good results are achieved when the relative combination is in a range of about 3-25 percent soft ionomer and about 75-97 percent hard ionomer.

Moreover, in alternative embodiments, the inner cover layer formulation may also comprise up to 100 wt % of a soft, low modulus non-ionomeric thermoplastic material including a polyester polyurethane such as B.F. Goodrich Company's Estane® polyester polyurethane X-4517. The non-ionomeric thermoplastic material may be blended with a soft ionomer. For example, polyamides blend well with soft ionomer. According to B.F. Goodrich, Estane® X-4517 has the following properties:

TABLE 12

Properties of Estane ® X-4517

| Tensile | 1430 |
|---|---|
| 100% | 815 |
| 200% | 1024 |
| 300% | 1193 |
| Elongation | 641 |
| Youngs Modulus | 1826 |
| Hardness A/D | 88/39 |
| Bayshore Rebound | 59 |
| Solubility in Water | Insoluble |
| Melt processing temperature | >350° F. (>177° C.) |
| Specific Gravity (H₂O = 1) | 1.1–1.3 |

Other soft, relatively low modulus non-ionomeric thermoplastic elastomers may also be utilized to produce the inner cover layer as long as the non-ionomeric thermoplastic elastomers produce the playability and durability characteristics desired without adversely effecting the enhanced travel distance characteristic produced by the high acid ionomer resin composition. These include, but are not limited to thermoplastic polyurethanes such as Texin® thermoplastic polyurethanes from Mobay Chemical Co. and the Pellethane® thermoplastic polyurethanes from Dow Chemical Co.; non-ionomeric thermoset polyurethanes including but not limited to those disclosed in U.S. Pat. No. 5,334,673; cross-linked metallocene catalyzed polyolefins; ionomer/rubber blends such as those in Spalding U.S. Pat. Nos. 4,986,545; 5,098,105 and 5,187,013; and, Hytrel® polyester elastomers from DuPont and Pebax® polyetheramides from Elf Atochem S.A.

While the dual core component described below, and the soft inner cover layer formed thereon, provide the multilayer golf ball with generally improved playability properties, the outer cover layer 16 is comparatively harder than the inner cover layer. The hardness provides for improved power and distance. The outer cover layer or ply is preferably comprised of a relatively hard polyurethane material described in greater detail again. In an alternate embodiment, high acid (greater than 16 weight percent acid) ionomer, low acid (16 weight percent acid or less) ionomer, an ionomer blend, a non-ionomeric thermoplastic or thermosetting material such as, but not limited to, a metallocene catalyzed polyolefin such as Exact® material available from Exxon, a polyurethane, a polyester elastomer such as that marketed by DuPont under the trademark Hytrel®, or a polyether amide such as that marketed by Elf Atochem S.A. under the trademark Pebax®, a blend of two or more non-ionomeric thermoplastic or thermosetting materials, or a blend of one or more ionomers and one or more non-ionomeric thermoplastic materials may be used. The outer layer is fairly thin (i.e. from about 0.0075 to about 0.0225 inches in thickness, more desirably 0.0125 to 0.0175 inches, and most preferably from about 0.015 to about 0.0175 inches in thickness for a 1.680 inch ball and 0.01 to 0.07 inches in thickness for a 1.72 inch or more ball), but thick enough to achieve desired playability characteristics while minimizing expense. Thickness is defined as the average thickness of the non-dimpled areas of the outer cover layer. The outer cover layer, such as layer 16, preferably has a Shore D hardness of 50 or more, preferably 55 or more, and more preferably 60 or more.

The outer cover layer of the invention is formed over a core to result in a golf ball having a coefficient of restitution of at least 0.770, more preferably at least 0.780, and most preferably at least 0.790. The coefficient of restitution of the ball will depend upon the properties of both the core and the cover. The PGA compression of the golf ball is 115 or less, and preferably is 100 or less.

Additional materials may also be added to the inner and outer cover layers of the present invention as long as they do not substantially reduce the playability properties of the ball. Such materials include dyes (for example, Ultramarine Blue™ sold by Whitaker, Clark, and Daniels of South Plainsfield, N.J.) (see U.S. Pat. No. 4,679,795), pigments such as titanium dioxide, zinc oxide, barium sulfate and zinc sulfate; UV absorbers; antioxidants; antistatic agents; and stabilizers. Moreover, the cover compositions of the present invention may also contain softening agents such as those disclosed in U.S. Pat. Nos. 5,312,857 and 5,306,760, including plasticizers, metal stearates, processing acids, etc., and reinforcing materials such as glass fibers and inorganic fillers, as long as the desired properties produced by the golf ball covers of the invention are not impaired.

As previously noted, it is most preferred that the one or more cover layers comprise at least one polyurethane material. It is preferred that the outer cover layer comprise one or more polyurethane materials. Before addressing the details of the preferred polyurethane materials for use in the outer cover layer, and their associated characteristics, it is instructive to review the nature and chemistry of polyurethanes.

Polyurethanes are polymers which are used to form a broad range of products. They are generally formed by mixing two primary ingredients during processing. For the most commonly used polyurethanes, the two primary ingredients are a polyisocyanate (for example, diphenylmethane diisocyanate monomer ("MDI") and toluene diisocyanate ("TDI") and their derivatives) and a polyol (for example, a polyester polyol or a polyether polyol).

A wide range of combinations of polyisocyanates and polyols, as well as other ingredients, are available. Furthermore, the end-use properties of polyurethanes can be controlled by the type of polyurethane utilized, i.e., whether the material is thermoset (crosslinked molecular structure) or thermoplastic (linear molecular structure).

Crosslinking occurs between the isocyanate groups (—NCO) and the polyol's hydroxyl end-groups (—OH). Additionally, the end-use characteristics of polyurethanes can also be controlled by different types of reactive chemicals and processing parameters. For example, catalysts are utilized to control polymerization rates. Depending upon the processing method, reaction rates can be very quick (as in the case for some reaction injection molding systems— "RIM") or may be on the order of several hours or longer (as in several coating systems). Consequently, a great variety of polyurethanes are suitable for different end-uses.

Polyurethane has been used for golf balls and other game balls as a cover material. Commercially available polyurethane golf balls have been made of thermoset polyurethanes. A polyurethane becomes irreversibly "set" when a polyurethane prepolymer is crosslinked with a polyfunctional curing agent, such as polyamine and polyol. The prepolymer typically is made from polyether or polyester. Diisocyanate polyethers are preferred because of their water resistance.

The physical properties of thermoset polyurethanes are controlled substantially by the degree of crosslinking. Tightly crosslinked polyurethanes are fairly rigid and strong. A lower amount of crosslinking results in materials that are flexible and resilient. Thermoplastic polyurethanes have some crosslinking, but purely by physical means. The crosslinking bonds can be reversibly broken by increasing temperature, as occurs during molding or extrusion. In this regard, thermoplastic polyurethanes can be injection molded, and extruded as sheet and blown film. They can be used to up to about 350° F. and are available in a wide range of hardnesses.

Polyurethanes typically are formed by reacting a polyol with a polyisocyanate. In some cases, the polyisocyanate is in the form of a polyurethane prepolymer formed from a polyether or polyester and a polyisocyanate. The polyol or polyamine is typically referred to as a "curing" agent. Examples of reactants used to form polyurethanes by this technique are discussed in U.S. Pat. No. 5,006,297, herein incorporated by reference. In other cases a polyester or acrylic polyol is reacted with a polyisocyanate.

Two types of polyisocyanates are predominantly used to make polyurethanes, diphenylmethane diisocyanate monomer (MDI) and its derivatives, and toluene diisocyanate (TDI) and its derivatives.

MDI is the most widely used polyisocyanate. Both rigid and flexible foams, reaction injection moldings, elastomers, coatings, and casting compounds are made from MDI. There are three basic grades of MDI, polymeric MDI, pure MDI, and pure MDI derivatives.

Polymeric MDI is used in both cellular and non-cellular products. However, because of the high thermal insulation properties possible with polymeric MDI, its main use is in closed-cell, rigid foam insulation for the construction and refrigeration industries. Other uses are high-resilience (HR) flexible foam, carpet backing, and binders.

Pure MDI, which is produced from polymeric MDI, is a low-melting-temperature (about 100° F.) solid. Its primary use is in thermoplastic and cast elastomers. It also is used as an additive for synthetic fibers to achieve high fiber tenacity and elongation.

Pure MDI derivatives are tailored to provide specific processing and reaction characteristics. A major use for these solvent-free liquids is in reaction injection molding (RIM), but they also find application in integral skin moldings, semi-flexible moldings, and cast elastomers.

Toluene diisocyanate, TDI, is used almost exclusively to make flexible foam. TDI, however, also finds some use in elastomers, sealants, and coatings. TDI's generally are water-white liquids which have much higher isocyanate (—NCO) contents than any MDI, but lower molecular weights.

MDI and TDI also are blended, particularly for producing flexible molded foams. The free-flowing, brown liquid blends have nearly as high isocyanate contents as TDI.

A wide array of other isocyanates can be utilized. Examples include, but are not limited to p-phenylene diisocyanate (PPDI) (CAS Registry No. 104-49-4); toluene diisocyanate (TDI) (CAS Registry No. 1321-38-6); 4,4'-methylenebis-(phenylisocyanate) (MDI) (CAS Registry No. 101-68-8); polymethylene polyphenyl isocyanate (PMDI) (CAS Registry No. 9016-87-9); 1,5-naphthalene diisocyanate (NDI) (CAS Registry No. 3173-72-6); bitolylene diisocyanate (TODI) (CAS Registry No. 91-97-4); m-xylylene diisocyanate (XDI) (CAS Registry No. 3634-83-1); m-tetramethyl-xylylene (TMXDI) (CAS Registry No. 58067-42-8); hexamethylene diisocyanate (HDI) (CAS Registry No. 822-06-0); 1,6-diisocyanato-2,2,4,4-tetra-methylhexane (TMDI) (CAS Registry No. 83748-30-5); 1,6-diisocyanato-2,4,4-trimethylhexane (TMDI) (CAS Registry No. 15646-96-5); trans-cyclohexane-1,4-diisocyanate (CHDI) (CAS Registry No. 2556-36-7); 1,3-bis(isocyanato-methyl)cyclo-hexane (HXDI) (CAS Registry No. 38661-72-2); 3-isocy-anato-methyl-3,5,5-trimethylcyclo-hexyl isocyanate (IPDI) (CAS Registry No. 4098-71-9); dicyclohexylmethane diisocyanate (HMDI) (CAS Registry No. 5124-30-1).

Two basic types of polyols are used in polyurethanes systems: polyesters and polyethers. Polyethers are the most widely used.

Often in referring to polyols, their functionality is specified. The functionality pertains to the number of reactive sites, which in turn, controls crosslinking. The more crosslinked (higher functionality), the more rigid will be the polyurethane. Functionality is controlled by the initiator used to manufacture the polyol. Glycerine, for example, is commonly used to initiate triol (3 functional) polyols. To this initiator is added an oxide such as propylene oxide, ethylene oxide, or a combination, to extend the molecular chain and tailor final processing and performance characteristics of the polyol. Triols typically are used to produce flexible foams; diols are used for elastomers, coatings, and sealants; and tetrols typically are used for rigid foams.

Polyether-based polyols have greater resistance to hydrolysis. Polyether polyols can be modified by the in-situ polymerization of acrylonitrile/styrene monomers. The resulting graft polyols generally produce flexible foams with improved load-bearing properties as well as greater tensile and tear strengths. Depending on the backbone on which these vinyl monomers are grafted, a wide range of performance characteristics can be developed.

Polyester polyols yield polyurethanes with greater strength properties, wear resistance, and thermal stability than polyether polyurethanes, and they can absorb more energy. These materials, however, are generally more expensive than polyethers.

Polyester polyols are typically classed by molecular weight. Low molecular weight polyols (less than 1500) are used in coatings, casting compounds, and rigid foams. Medium molecular weight polyols (1550 to 2500) are used in elastomers. And, high molecular weight polyols (greater than 2500) are used in flexible foams.

Thermoset polyurethanes are typically crosslinked and cannot be repeatedly thermoformed. On the other hand, thermoplastic polyurethanes are similar to other thermoplastics in that they can be repeatedly plasticized by the influence of temperature and pressure.

The crosslinkable thermoplastic polyurethane used to form a game ball according to the present invention is initially a thermoplastic, and in this state can be melted and solidified repeatedly. However, the material can be readily crosslinked, thereby increasing its hardness and providing that it cannot be reversibly melted without thermal degradation.

A wide array of crosslinkable thermoplastic polyurethanes can be used in the present invention. For example, EBXL-TPU is a thermoplastic polyurethane recently made available from Zylon Polymers, 23 Mountain Avenue, Monsey, N.Y. 10952. EBXL-TPU is a pelletized, medical grade, polyether or polyester based thermoplastic polyurethane, reactor modified to allow crosslinking by ionizing radiation. It is a low melt index material suitable for extrusion into profiles, film and sheet, or injection molding. Once crosslinked, the material combines the ease of processing and toughness of TPU with the improved resistance to water, solvents and elevated temperatures characteristic of thermoset materials. Table 13 below, sets forth details of this preferred material.

TABLE 13

EBXL - TPU
Typical Physical Properties

| PROPERTY | VALUE | UNITS |
| --- | --- | --- |
| Radiation | 12.5–15 | MegaRads |
| Shore Hardness | 80 | Shore A |
| Specific Gravity | 1.04 | gr/cc |
| Tensile Strength | 5000 | psi |
| Ultimate Elongation | 425 | % |
| Compression set, 70 hrs @ 100 deg C. | 50 | % |
| Melt Flow Index | 2 | gms/10 min |
| FLUID RESISTANCES | | |
| Water, 24 hrs @ 23 C. | no effect | |
| Isopropyl Alcohol, 100% 24 hrs @ 23 C. | no effect | |
| Tetrahydrofuran, 24 hrs @ 23 C. | swells, does not dissolve | |

A further preferred class of crosslinkable thermoplastic polyurethanes is a commercially available polyurethane from BASF, designated as Elastollan®. Properties of several specific formulations of Elastollan® polyurethanes are set forth in Table 14 below.

TABLE 14

| Physical properties[1] | Units | ASTM Method | 1175AW[3] | 1180A | 1185A | 1190A | 1195A | 1154D | 1160D | 1164D | 1174D |
| --- | --- | --- | --- | --- | --- | --- | --- | --- | --- | --- | --- |
| Specific gravity | gr/cc | D-792 | 1.14 | 1.11 | 1.12 | 1.13 | 1.14 | 1.16 | 1.17 | 1.18 | 1.19 |
| Hardness | Shore A | D-224 | 76 ± 2 | 80 ± 2 | 86 ± 2 | 91 ± 2 | 95 ± 2 | — | — | — | — |
|  | D |  | — | — | — | 42 ± 2 | 47 ± 2 | 53 ± 2 | 60 ± 2 | 64 ± 2 | 73 ± 2 |
| Tensile strength | MPa | D-412 | 30 | 32 | 33 | 37 | 36 | 40 | 40 | 41 | 45 |
|  | psi |  | 4500 | 4700 | 4800 | 5300 | 5200 | 5800 | 5800 | 6000 | 6500 |
| Tensile stress |  | D-412 |  |  |  |  |  |  |  |  |  |
| @100% elongation | MPa |  | 4.3 | 5.5 | 7.6 | 10 | 12 | 20 | 22 | 25 | 32 |
|  | psi |  | 620 | 800 | 1100 | 1500 | 1750 | 2900 | 3200 | 3600 | 4600 |
| @300% elongation | MPa |  | 8.3 | 10 | 12 | 17 | 21 | 30 | 33 | 33 | 38 |
|  | psi |  | 1180 | 1500 | 1750 | 2500 | 3000 | 4300 | 4800 | 4800 | 5500 |
| Elongation @brk. | % | D-412 | 740 | 600 | 640 | 575 | 490 | 460 | 415 | 425 | 350 |
| Tensile set @brk. | % | D-412 | — | 45 | 70 | 75 | 65 | 70 | 60 | 90 | 80 |

TABLE 14-continued

| Physical properties[1] | Units | ASTM Method | 1175AW[3] | 1180A | 1185A | 1190A | 1195A | 1154D | 1160D | 1164D | 1174D |
|---|---|---|---|---|---|---|---|---|---|---|---|
| Tear strength | kN/m | D-624 | 80 | 90 | 105 | 125 | 140 | 180 | 205 | 220 | 255 |
| | pli | DIE C | 460 | 515 | 600 | 715 | 800 | 1025 | 1170 | 1250 | 1450 |
| Abrasion resistance | mg (loss) | D-1044[2] (Taber) | | 25 | 30 | 45 | 55 | 75 | 50 | 55 | 75 |

NOTE:
[1]Test samples were cured 20 hours @ 100° C. before testing.
[2]H-18 wheel, 1000 gm weight and 1000 cycles.
[3]Contains proprietary plasticizer.

Elastollan® 1100 series of products are polyether-based thermoplastic polyurethanes. They exhibit excellent low temperature properties, hydrolysis resistance and fungus resistance. These products can be injection and blow molded and extruded.

BASF indicates that Elastollan® 1175AW, 80A, 90A and 95A are suitable for extrusion. And, Elastollan® 1175AW to 1174D are suitable for injection molding. BASF further provides that a grade should be dried before processing. Elastollan® can be stored for up to 1 year in its original sealed container. Containers should be stored in a cool, dry area. Elastollan® TPU's from BASF are commercial TPU's but will not crosslink using irradiation unless a particular reactive co-agent such as Liquiflex™ H, described below, is added. Nearly any other commercially available TPU such as Urepan®, Pellethane®, Morthane®, Desmopan®, etc. can be used provided it is compounded with a co-agent that readily crosslinks with radiation.

Liquiflex™ is a commercially available hydroxyl terminated polybutadiene (HTPB), from Petroflex. It is believed that this co-agent enables the thermoplastic polyurethane to crosslink upon exposure to radiation. It is believed that the previously noted thermoplastic polyurethane EBXL-TPU from Zylon contains a co-agent similar to Liquiflex™.

As indicated above, numerous ways are known to induce crosslinking in a polymer by free radical initiation, including peroxide initiation and irradiation. The golf ball covers of the present invention preferably are crosslinked by irradiation, and more preferably light rays such as gamma or UV irradiation. Furthermore, other forms of particle irradiation, including electron beam also can be used. Gamma radiation is preferred as golf balls or game balls can be irradiated in bulk. Gamma penetrates very deep but also increases crosslinking of the inner core and the compression of the core has to be adjusted to allow for the increase in hardness.

Electron beam techniques are faster but cannot be used for treating in bulk as the electron beam does not penetrate very deep and the product needs to be rotated to obtain an even crosslink density.

The type of irradiation to be used will depend in part upon the underlying layers. For example, certain types of irradiation may degrade windings in a wound golf ball. On the other hand, balls with a solid core would not be subject to the same concerns. However, with any type of core, certain types of irradiation will tend to crosslink and thus harden the core. Depending upon whether this type of effect is sought or is to be avoided, the appropriate type of irradiation can be selected.

The level of radiation employed depends upon the desired end characteristics of the final game ball, e.g. golf ball, cover. However, generally a wide range of dosage levels may be used. For example, total dosages of up to about 12.5, or even 15 Mrads may be employed. Preferably, radiation delivery levels are controlled so that the game ball is not heated above about 80° C. (176° F.) while being crosslinked.

One polyurethane component which can be used in the present invention incorporates meta-tetramethylxylyliene diisocyanate (TMXDI (meta)) aliphatic isocyanate (Cytec Industries, West Paterson, N.J.). Polyurethanes based on meta-tetramethylxylyliene diisocyanate can provide improved gloss retention, UV light stability, thermal stability and hydrolytic stability. Additionally, TMXDI (META) aliphatic isocyanate has demonstrated favorable toxicological properties. Furthermore, because it has a low viscosity, it is usable with a wider range of diols (to polyurethane) and diamines (to polyureas). If TMXDI is used, it typically, but not necessarily, is added as a direct replacement for some or all of the other aliphatic isocyanates in accordance with the suggestions of the supplier. Because of slow reactivity of TMXDI, it may be useful or necessary to use catalysts to have practical demolding times. Hardness, tensile strength and elongation can be adjusted by adding further materials in accordance with the supplier's instructions.

Non-limiting examples of suitable RIM systems for use in the present invention are Bayflex® elastomeric polyurethane RIM systems, Baydur® GS solid polyurethane RIM systems, Prisms® solid polyurethane RIM systems, all from Bayer Corp. (Pittsburgh, Pa.), Spectrim® reaction moldable polyurethane and polyurea systems from Dow Chemical USA (Midland, Mich.), including Spectrim® MM 373-A (isocyanate) and 373-B (polyol), and Elastolit® SR systems from BASF (Parsippany, N.J.). Preferred RIM systems include Bayflex® MP-10000 and Bayflex® 110-50, filled and unfilled. Further preferred examples are polyols, polyamines and isocyanates formed by processes for recycling polyurethanes and polyureas.

As noted, the present invention golf balls utilize a unique dual core configuration. Preferably, the cores comprise (i) an interior spherical center component formed from a thermoset material, a thermoplastic material, or combinations thereof and (ii) a core layer disposed about the spherical center component, the core layer formed from a thermoset material, a thermoplastic material, or combinations thereof. Most preferably, the core layer is disposed immediately adjacent to, and in intimate contact with the center component. The cores may further comprise (iii) an optional outer core layer disposed about the core layer. Most preferably, the outer core layer is disposed immediately adjacent to, and in intimate contact with the core layer. The outer core layer may be formed from a thermoset material, a thermoplastic material, or combinations thereof.

Figure 3:
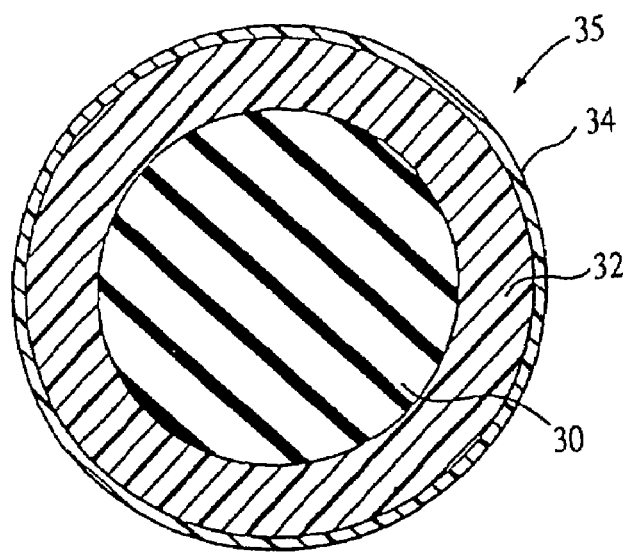
FIG. 3 is a cross-sectional view of another preferred embodiment golf ball in accordance with the present invention comprising a dual core component and a multi-layer cover assembly.

The present invention provides several additionally preferred embodiment golf balls utilizing the unique dual core configuration and the previously described cover layers. Referring to FIG. 3, a preferred embodiment golf ball 35 is illustrated comprising a core 30 formed from a thermoset material surrounded by a core layer 32 formed from a thermoplastic material. A multi-layer cover 34 surrounds the core 30 and core layer 32. The multi-layer cover 34 preferably corresponds to the previously described multi-layer cover 12.

Figure 4:
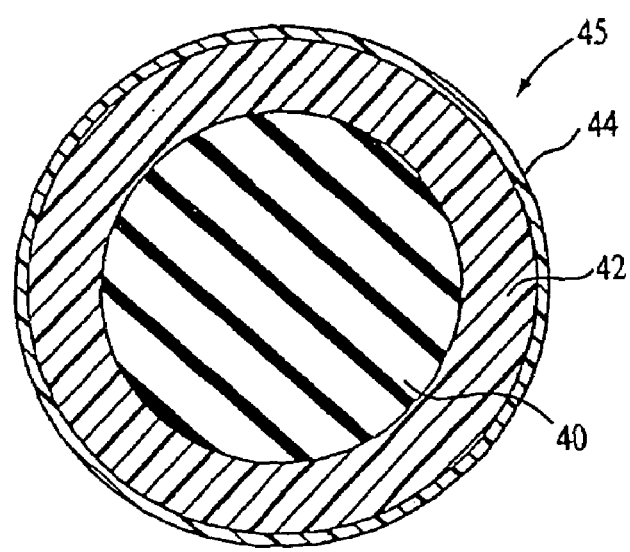
FIG. 4 is a cross-sectional view of yet another preferred embodiment golf ball in accordance with the present invention comprising a dual core component and a multi-layer cover assembly.

As illustrated in FIG. 4, another preferred embodiment golf ball 45 in accordance with the present invention is illustrated. The preferred embodiment golf ball 45 comprises a core 40 formed from a thermoplastic material surrounded by a core layer 42. The core layer 42 is formed from a thermoset material. A multi-layer cover 44 surrounds the core 40 and the core layer 42. Again, the multi-layer cover 44 preferably corresponds to the previously described multi-layer cover 12.

Figure 5:
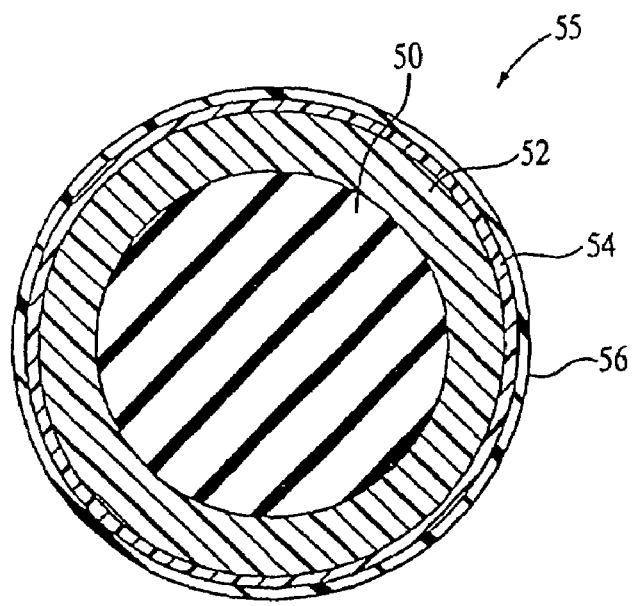
FIG. 5 is a cross-sectional view of another preferred embodiment golf ball in accordance with the present invention comprising a dual core component, outer core layer, and a multi-layer cover assembly.

FIG. 5 illustrates yet another preferred embodiment golf ball 55 in accordance with the present invention. The preferred embodiment golf ball 55 comprises a core 50 formed from a thermoplastic material. A core layer 52 surrounds the core 50. The core layer 52 is formed from a thermoplastic material which may be the same as the material utilized with the core 50, or one or more other or different thermoplastic materials. The preferred embodiment golf ball 55 utilizes an optional outer core layer 54 that surrounds the core component 50 and the core layer 52. The outer core layer 54 is formed from a thermoplastic material which may be the same or different than any of the thermoplastic materials utilized by the core 50 and the core layer 52. The golf ball 55 further comprises a multi-layer cover 56 that is preferably similar to the previously described multi-layer cover 12.

Figure 6:
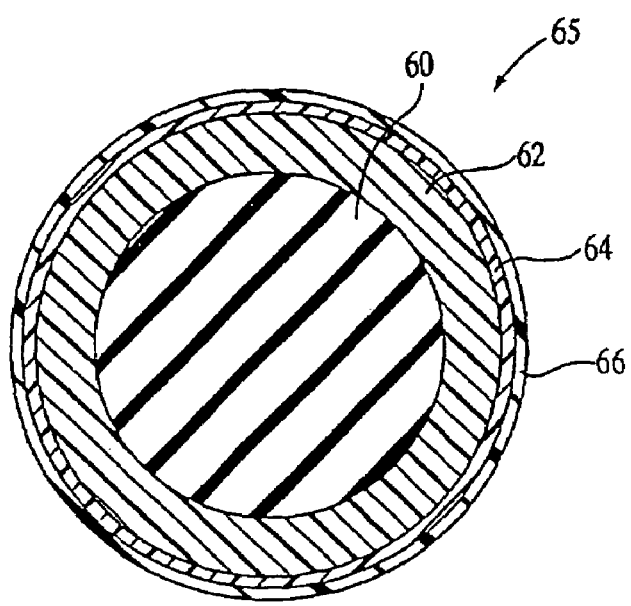
FIG. 6 is a cross-sectional view of yet another preferred embodiment golf ball in accordance with the present invention comprising a dual core component, outer core layer, and a multi-layer cover assembly.

FIG. 6 illustrates yet another preferred embodiment golf ball 65 in accordance with the present invention. The preferred embodiment golf ball 65 comprises a core 60 formed from a thermoplastic, thermoset material, or any combination of a thermoset and thermoplastic material. A core layer 62 surrounds the core 60. The core layer 62 is formed from a thermoset material. The preferred embodiment golf ball 65 also comprises an optional outer core layer 64 formed from a thermoplastic material. A multi-layer cover 66, preferably similar to the previously described multi-layer cover 12, is disposed about, and generally surrounds, the core 60, the core layer 62 and the outer core 64.

A wide array of thermoset materials can be utilized in the present invention dual cores. Examples of suitable thermoset materials include butadiene or any natural or synthetic elastomer, including metallocene polyolefins, polyurethanes, silicones, polyamides, polyureas, or virtually any irreversibly cross-linked resin system. It is also contemplated that epoxy, phenolic, and an array of unsaturated polyester resins could be utilized.

The thermoplastic material utilized in the present invention golf balls and, particularly their dual cores, may be nearly any thermoplastic material. Examples of typical thermoplastic materials for incorporation in the golf balls of the present invention include, but are not limited to, ionomers, polyurethane thermoplastic elastomers, and combinations thereof. It is also contemplated that a wide array of other thermoplastic materials could be utilized, such as polysulfones, fluoropolymers, polyamide-imides, polyarylates, polyaryletherketones, polyaryl sulfones/polyether sulfones, polybenzimidazoles, polyether-imides, polyimides, liquid crystal polymers, polyphenylene sulfides; and specialty high-performance resins, and ultrahigh molecular weight polyethylenes.

Additional examples of suitable thermoplastics include metallocenes, polyvinyl chlorides, acrylonitrile-butadiene-styrenes, acrylics, styrene-acrylonitriles, styrene-maleic anhydrides, polyamides (nylons), polycarbonates, polybutylene terephthalates, polyethylene terephthalates, polyphenylene ethers/polyphenylene oxides, reinforced polypropylenes, and high-impact polystyrenes.

Preferably, the thermoplastic materials have relatively high melting points, such as a melting point of at least about 300° F. Several examples of these preferred thermoplastic materials and which are commercially available include, but are not limited to, Capron® (a blend of nylon and ionomer), Lexan® polycarbonate, Pebax®, and Hytrel®. The polymers or resin system may be cross-linked by a variety of means such as by peroxide agents, sulphur agents, radiation or other cross-linking techniques.

Any or all of the previously described components in the cores of the golf ball of the present invention may be formed in such a manner, or have suitable fillers added, so that their resulting density is decreased or increased. For example, any of these components in the dual cores could be formed or otherwise produced to be light in weight. For instance, the components could be foamed, either separately or in-situ. Related to this, a foamed light weight filler agent may be added. In contrast, any of these components could be mixed with or otherwise receive various high density filler agents or other weighting components such as relatively high density fibers or particulate agents in order to increase their mass or weight.

The following commercially available thermoplastic resins are particularly preferred for use in the noted dual cores employed in the golf balls of the present invention: Capron® 8351 (available from Allied Signal Plastics), Lexan® ML5776 (from General Electric), Pebax® 3533 (a polyether block amide from Elf Atochem), and Hytrel® G4074 (from DuPont). Properties of these four preferred thermoplastics are set forth below in Tables 15-18. When forming a golf ball in accordance with the present invention, if the interior center component of the dual core is to comprise a thermoplastic material, it is most preferred to utilize Pebax® thermoplastic resin.

TABLE 15

CAPRON ® 8351

|  | ASTM Test |  |
|---|---|---|
| MECHANICAL |  |  |
| Tensile Strength, Yield, psi (Mpa) | 7,800 (54) | D-638 |
| Flexural Strength, psi (Mpa) | 9,500 (65) | D-790 |
| Flexural Modulus, psi (Mpa) | 230,000 (1,585) | D-790 |
| Ultimate Elongation, % | 200 | D-638 |
| Notched Izod Impact, ft-lbs/in (J/M) | No Break | D-256 |
| Drop Weight Impact, ft-lbs (J) | 150 (200) | D-3029 |
| Drop Weight Impact, @ −40° F., ft-lbs (J) | 150 (200) | D-3029 |
| PHYSICAL |  |  |
| Specific Gravity | 1.07 | D-792 |
| THERMAL |  |  |
| Melting Point, ° F. (° C.) | 420 (215) | D-789 |
| Heat Deflection @ 264 psi ° F. (° C.) | 140 (60) | D-648 |

TABLE 16

Lexan ® ML5776

| PROPERTY | TYPICAL DATA | UNIT | METHOD |
|---|---|---|---|
| MECHANICAL | | | |
| Tensile Strength, yield, Type I, 0.125" | 8500 | psi | ASTM D 638 |
| Tensile Strength, break, Type I, 0.125" | 9500 | psi | ASTM D 638 |
| Tensile Elongation, yield, Type I, 0.125" | 110.0 | % | ASTM D 638 |
| Flexural Strength, yield, 0.125" | 12000 | psi | ASTM D 790 |
| Flexural Modulus, 0.125" | 310000 | psi | ASTM D 790 |
| IMPACT | | | |
| Izod Impact, unnotched, 73 F. | 60.0 | ft-lb/in | ASTM D 4812 |
| Izod Impact, notched, 73 F. | 15.5 | ft-lb/in | ASTM D 256 |
| Izod Impact, notches 73 F., 0.250" | 12.0 | ft-lb/in | ASTM D 256 |
| Instrumented Impact Energy @ Peak, 73 F. | 48.0 | ft-lbs | ASTM D 3763 |
| THERMAL | | | |
| HDT, 264 psi, 0.250", unannealed | 257 | deg F. | ASTM D 648 |
| Thermal Index, Elec Prop | 80 | deg C. | UL 7468 |
| Thermal Index, Mech Prop with Impact | 80 | deg C. | UL 7468 |
| Thermal Index, Mech Prop without Impact | 80 | deg C. | UL 7468 |
| PHYSICAL | | | |
| Specific Gravity, solid | 1.19 | — | ASTM D 792 |
| Water Absorption, 24 hours @ 73 F. | 0.150 | % | ASTM D 570 |
| Mold Shrinkage, flow, 0.125" | 5.7 | in/in E-3 | ASTM D 955 |
| Melt Flow Rate, nom'l, 300 C./1.2 kgf(0) | 7.5 | g/10 min | ASTM D 1238 |
| FLAME CHARACTERISTICS | | | |
| UL File Number, USA | E121562 | — | — |
| 94 HB Rated (tested thickness) | 0.060 | inch | UL94 |

TABLE 17

PEBAX ® RESINS

| PROPERTY | ASTM TEST METHOD | UNITS | Pebax ® 3533 |
|---|---|---|---|
| Specific Gravity | D792 | sp gr 23/23 C. | 0.5 |
| Water Absorption Equilibrium (20° C., 50% R.H.>) 24 Hr. Immersion | D570 | | 1.2 |
| Hardness | D2240 | | 35 D |
| Tensile Strength, Ultimate | D638 | psi | 5600 |
| Elongation, Ultimate | D638 | % | 580 |
| Flexural Modulus | D790 | psi | 2800 |
| Izod Impact, Notched 20° C. | D256 | ft-lb./in. | NB |
| −40° C. | | | NB |
| Abrasion Resistance H18/1000 g | D1044 | Mg/1000 Cycles | 104 |
| Tear Resistance Notched | D624C | lb./in. | 260 |
| Melting Point | D3418 | ° F. | 306 |
| Vicat Softening Point | D1525 | ° F. | 165 |
| HDT 66 psi | D648 | ° F. | 115 |
| Compression Set (24 hr., 160° F.) | D395A | % | 54 |

TABLE 18

HYTREL ® G4074 Thermoplastic Elastomer

| PHYSICAL | ASTM Test METHOD | UNITS | VALUE |
|---|---|---|---|
| Dens/Sp Gr | ASTM D792 | sp gr 23/23 C. | 1.1800 |
| Melt Flow | ASTM D1238 | g/10 min | 5.20 @E − 190 C./2.16 kg |
| Wat Abs | ASTM D570 | | 2.100% |
| MECHANICAL | | | |
| Elong@Brk | ASTM D638 | | 230.0% |
| Flex Mod | ASTM D790 | | 9500 psi |
| TnStr@Brk | ASTM D638 | | 2000 psi |
| IMPACT | | | |
| Notch Izod | ASTM D256 | | No Break @ 73.0 F. @0.2500 inft-lb/in 0.50 @ −40.0 F. @0.2500 inft-lb/in |
| HARDNESS | | | |
| Shore D | ASTM D2240 | | 40 |
| THERMAL | | | |
| DTUL@66 | ASTM D648 | | 122 F. |
| Melt Point | | | 338.0 F. |
| Vicat Soft Melt Point | ASTM D1525 | | 248 F. |

The cores of the inventive golf balls typically have a coefficient of restitution of about 0.750 or more, more preferably 0.770 or more and a PGA compression of about 100 or less, and more preferably 80 or less. The cores have a weight of 25 to 40 grams and preferably 30 to 40 grams. The core can be compression molded from a slug of uncured or lightly cured elastomer composition comprising a high cis content polybutadiene and a metal salt of an alpha, beta-ethylenically unsaturated carboxylic acid such as zinc mono- or diacrylate or methacrylate. To achieve higher coefficients of restitution and/or to increase hardness in the core, the manufacturer may include a small amount of a metal oxide such as zinc oxide. In addition, larger amounts of metal oxide than are needed to achieve the desired coefficient may be included in order to increase the core weight so that the finished ball more closely approaches the U.S.G.A. upper weight limit of 1.620 ounces. Non-limiting examples of other materials which may be used in the core composition include compatible rubbers or ionomers, and low molecular weight fatty acids such as stearic acid. Free radical initiator catalysts such as peroxides are admixed with the core composition so that on the application of heat and pressure, a curing or cross-linking reaction takes place.

Wound cores are generally produced by winding a very long elastic thread around a solid or liquid filled balloon center. The elastic thread is wound around the center to produce a finished core of about 1.4 to 1.6 inches in diameter, generally. However, the preferred embodiment golf balls of the present invention preferably utilize a solid core, or rather a solid dual core configuration, as opposed to a wound core.

In preparing golf balls in accordance with the present invention, a soft inner cover layer is molded (preferably by injection molding or by compression molding) about a core (preferably a solid core, and most preferably a dual core). A comparatively harder outer layer is molded over the inner layer.

The dual cores of the present invention are preferably formed by compression molding techniques. However, it is fully contemplated that liquid injection molding or transfer molding techniques could be utilized.

In a particularly preferred embodiment of the invention, the golf ball has a dimple pattern which provides coverage of 65% or more. The golf ball typically is coated with a durable, abrasion-resistant, relatively non-yellowing finish coat.

The various cover composition layers of the present invention may be produced according to conventional melt blending procedures. Generally, the copolymer resins are blended in a Banbury® type mixer, two-roll mill, or extruder prior to neutralization. After blending, neutralization then occurs in the melt or molten states in the Banbury® mixer. Mixing problems are minimal because preferably more than 75 wt %, and more preferably at least 80 wt % of the ionic copolymers in the mixture contain acrylate esters and, in this respect, most of the polymer chains in the mixture are similar to each other. The blended composition is then formed into slabs, pellets, etc., and maintained in such a state until molding is desired. Alternatively, a simple dry blend of the pelletized or granulated resins, which have previously been neutralized to a desired extent, and colored masterbatch may be prepared and fed directly into the injection molding machine where homogenization occurs in the mixing section of the barrel prior to injection into the mold. If necessary, further additives such as an inorganic filler, etc., may be added and uniformly mixed before initiation of the molding process. A similar process is utilized to formulate the high acid ionomer resin compositions used to produce the inner cover layer. In one embodiment of the invention, a masterbatch of non-acrylate ester-containing ionomer with pigments and other additives incorporated therein is mixed with the acrylate ester-containing copolymers in a ratio of about 1-7 weight % masterbatch and 93-99 weight % acrylate ester-containing copolymer.

The golf balls of the present invention can be produced by molding processes which include but are not limited to those which are currently well known in the golf ball art. For example, the golf balls can be produced by injection molding or compression molding the novel cover compositions around a wound or solid molded core to produce an inner ball which typically has a diameter of about 1.50 to 1.67 inches. The core, preferably of a dual core configuration, may be formed as previously described. The outer layer is subsequently molded over the inner layer to produce a golf ball having a diameter of 1.620 inches or more, preferably about 1.680 inches or more. Although either solid cores or wound cores can be used in the present invention, as a result of their lower cost and superior performance solid molded cores are preferred over wound cores. The standards for both the minimum diameter and maximum weight of the balls are established by the United States Golf Association (U.S.G.A.).

In compression molding, the inner cover composition is formed via injection at about 380° F. to about 450° F. into smooth surfaced hemispherical shells which are then positioned around the core in a mold having the desired inner cover thickness and subjected to compression molding at 200° to 300° F. for about 2 to 10 minutes, followed by cooling at 50° to 70° F. for about 2 to 7 minutes to fuse the shells together to form a unitary intermediate ball. In addition, the intermediate balls may be produced by injection molding wherein the inner cover layer is injected directly around the core placed at the center of an intermediate ball mold for a period of time in a mold temperature of from 50° to about 100° F. Subsequently, the outer cover layer is molded around the core and the inner layer by similar compression or injection molding techniques to form a dimpled golf ball of a diameter of 1.680 inches or more.

As previously described, it is particularly preferred that the preferred embodiment polyurethane containing covers of the present invention golf balls be formed from a reaction injection molding (RIM) process.

The preferred method of forming a fast-chemical-reaction-produced component for a golf ball according to the invention is by reaction injection molding (RIM). RIM is a process by which highly reactive liquids are injected into a closed mold, mixed usually by impingement and/or mechanical mixing in an in-line device such as a "peanut mixer", where they polymerize primarily in the mold to form a coherent, one-piece molded article. The RIM processes usually involve a rapid reaction between one or more reactive components such as polyether—or polyester—polyol, polyamine, or other material with an active hydrogen, and one or more isocyanate—containing constituents, often in the presence of a catalyst. The constituents are stored in separate tanks prior to molding and may be first mixed in a mix head upstream of a mold and then injected into the mold. The liquid streams are metered in the desired weight to weight ratio and fed into an impingement mix head, with mixing occurring under high pressure, e.g., 1500 to 3000 psi. The liquid streams impinge upon each other in the mixing chamber of the mix head and the mixture is injected into the mold. One of the liquid streams typically contains a catalyst for the reaction. The constituents react rapidly after mixing to gel and form polyurethane polymers. Polyureas, epoxies, and various unsaturated polyesters also can be molded by RIM.

RIM differs from non-reaction injection molding in a number of ways. The main distinction is that in RIM a chemical reaction takes place in the mold to transform a monomer or adducts to polymers and the components are in liquid form. Thus, a RIM mold need not be made to withstand the pressures which occur in a conventional injection molding. In contrast, injection molding is conducted at high molding pressures in the mold cavity by melting a solid resin and conveying it into a mold, with the molten resin often being at about 150 to about 350° C. At this elevated temperature, the viscosity of the molten resin usually is in the range of 50,000 to about 1,000,000 centipoise, and is typically around 200,000 centipoise. In an injection molding process, the solidification of the resins occurs after about 10 to about 90 seconds, depending upon the size of the molded product, the temperature and heat transfer conditions, and the hardness of the injection molded material. Subsequently, the molded product is removed from the mold. There is no significant chemical reaction taking place in an injection molding process when the thermoplastic resin is introduced into the mold. In contrast, in a RIM process, the chemical reaction causes the material to set, typically in less than about 5 minutes, often in less than 2 minutes, preferably less than 1 minute, more preferably in less than 30 seconds, and in many cases in about 10 seconds or less.

If plastic products are produced by combining components that are preformed to some extent, subsequent failure can occur at a location on the cover which is along the seam or parting line of the mold. Failure can occur at this location because this interfacial region is intrinsically different from the remainder of the cover layer and can be weaker or more stressed. The present invention is believed to provide for improved durability of a golf ball cover layer by providing a uniform or "seamless" cover in which the properties of the cover material in the region along the parting line are generally the same as the properties of the cover material at other locations on the cover, including at the poles. The improvement in durability is believed to be a result of the fact that the reaction mixture is distributed uniformly into a closed mold. This uniform distribution of the injected materials eliminates knit-lines and other molding deficiencies which can be caused by temperature difference and/or reaction difference in the injected materials. The process of the invention results in generally uniform molecular structure, density and stress distribution as compared to conventional injection-molding processes.

The fast-chemical-reaction-produced component has a flex modulus of 1 to 310 kpsi, more preferably 5 to 100 kpsi, and most preferably 5 to 80 kpsi. The subject component can be a cover with a flex modulus which is higher than that of the centermost component of the cores, as in a liquid center core and some solid center cores. Furthermore, the fast-chemical-reaction-produced component can be a cover with a flex modulus that is higher than that of the immediately underlying layer, as in the case of a wound core. The core can be one piece or multi-layer, each layer can be either foamed or unfoamed, and density adjusting fillers, including metals, can be used. The cover of the ball can be harder or softer than any particular core layer.

The fast-chemical-reaction-produced component can incorporate suitable additives and/or fillers. When the component is an outer cover layer, pigments or dyes, accelerators and UV stabilizers can be added. Examples of suitable optical brighteners which probably can be used include Uvitex® and Eastobrite® OB-1. An example of a suitable white pigment is titanium dioxide. Examples of suitable and UV light stabilizers are provided in commonly assigned U.S. Pat. No. 5,494,291, herein incorporated by reference. Fillers which can be incorporated into the fast-chemical-reaction-produced cover or core component include those listed herein. Furthermore, compatible polymeric materials can be added. For example, when the component comprises polyurethane and/or polyurea, such polymeric materials include polyurethane ionomers, polyamides, etc.

One of the significant advantages of the RIM process according to the invention is that polyurethane or other cover materials can be recycled and used in golf ball cores. Recycling can be conducted by, e.g., glycolysis. Typically, 10 to 90% of the material which is injection molded actually becomes part of the cover. The remaining 10 to 90% is recycled.

Recycling of polyurethanes by glycolysis is known from, for example, RIM Part and Mold Design—Polyurethanes, 1995, Bayer Corp., Pittsburgh, Pa. Another significant advantage of the present invention is that because reaction injection molding occurs at low temperatures and pressures, i.e., 90 to 180° F. and 50 to 200 psi, this process is particularly beneficial when a cover is to be molded over a very soft core. When higher pressures are used for molding over soft cores, the cores "shut off" i.e., deform and impede the flow of material causing uneven distribution of cover material. There are several significant advantages that a RIM process offers over currently known techniques.

First, during the RIM process of the present application, the chemical reaction, i.e., the mixture of isocyanate from the isocyanate tank and polyol from the polyol tank, occurs during the molding process. Specifically, the mixing of the reactants occurs in the recirculation mix head and the after mixer, both of which are connected directly to the injection mold. The reactants are simultaneously mixed and injected into the mold, forming the desired component.

Typically, prior art techniques utilize mixing of reactants to occur before the molding process. Mixing under either compression or injection molding occurs in a mixer that is not connected to the molding apparatus. Thus, the reactants must first be mixed in a mixer separate from the molding apparatus, then added into the apparatus. Such a process causes the mixed reactants to first solidify, then later melt in order to properly mold.

Second, the RIM process requires lower temperatures and pressures during molding than does injection or compression molding. Under the RIM process, the molding temperature is maintained at about 100-120° F. in order to ensure proper injection viscosity. Compression molding is typically completed at a higher molding temperature of about 320° F. (160° C.). Injection molding is completed at even a higher temperature range of 392-482° F. (200-250° C.). Molding at a lower temperature is beneficial when, for example, the cover is molded over a very soft core so that the very soft core does not melt or decompose during the molding process.

Third, the RIM process creates more favorable durability properties in a golf ball than does conventional injection or compression molding. The preferred process of the present invention provides improved durability for a golf ball cover by providing a uniform or "seamless" cover in which the properties of the cover material in the region along the parting line are generally the same as the properties of the cover material at other locations on the cover, including at the poles. The improvement in durability is due to the fact that the reaction mixture is distributed uniformly into a closed mold. This uniform distribution of the injected materials reduces or eliminates knit-lines and other molding deficiencies which can be caused by temperature difference and/or reaction difference in the injected materials. The RIM process of the present invention results in generally uniform molecular structure, density and stress distribution as compared to conventional injection molding processes, where failure along the parting line or seam of the mold can occur because the interfacial region is intrinsically different from the remainder of the cover layer and, thus, can be weaker or more stressed.

Fourth, the RIM process is relatively faster than the conventional injection and compression molding techniques. In the RIM process, the chemical reaction takes place in under 5 minutes, typically in less than two minutes, preferably in under one minute and, in many cases, in about 30 seconds or less. The demolding time of the present application is 10 minutes or less. The molding process alone for the conventional methods typically take about 15 minutes. Thus, the overall speed of the RIM process makes it advantageous over the injection and compression molding methods.

A golf ball manufactured according the preferred method described herein exhibits unique characteristics. Golf ball covers made through compression molding and traditional injection molding include balata, ionomer resins, polyesters resins and polyurethanes. The selection of polyurethanes which can be processed by these methods is limited. Polyurethanes are often a desirable material for golf ball covers because balls made with these covers are more resistant to scuffing and resistant to deformation than balls made with covers of other materials. The current invention allows processing of a wide array of grades of polyurethane through RIM which was not previously possible or commercially practical utilizing either compression molding or traditional injection molding. For example, utilizing the present invention method and Bayer MP-10000 polyurethane resin, a golf ball with the properties described below has been provided. It is anticipated that other urethane resins such as Bayer MP-7500, Bayer MP-5000, Bayer aliphatic or light stable resins, and Uniroyal aliphatic and aromatic resins may be used.

Some of the unique characteristics exhibited by a golf ball according to the present invention include a thinner cover without the accompanying disadvantages otherwise associated with relatively thin covers such as weakened regions at which inconsistent compositional or structural differences exist. A traditional golf ball cover typically has a thickness in the range of about 0.060 inches to 0.080 inches. A golf ball of the present invention may utilize a cover having a thickness of about 0.015 inches 0.045 inches. This reduced cover thickness is often a desirable characteristic. It is contemplated that thinner layer thicknesses are possible using the present invention.

Because of the reduced pressure involved in RIM as compared to traditional injection molding, a cover or any other layer of the present invention golf ball is more dependably concentric and uniform with the core of the ball, thereby improving ball performance. That is, a more uniform and reproducible geometry is attainable by employing the present invention.

After molding, the golf balls produced may undergo various further processing steps such as buffing, painting and marking as disclosed in U.S. Pat. No. 4,911,451.

Various aspects of the present invention golf balls have been described in terms of certain tests or measuring procedures. These are described in greater detail as follows.

As used herein, "Shore D hardness" of a cover is measured generally in accordance with ASTM D-2240, except the measurements are made on the curved surface of a molded cover, rather than on a plaque. Furthermore, the Shore D hardness of the cover is measured while the cover remains over the core. When a hardness measurement is made on a dimpled cover, Shore D hardness is measured at a land area of the dimpled cover.

The resilience or coefficient of restitution (COR) of a golf ball is the constant "e," which is the ratio of the relative velocity of an elastic sphere after direct impact to that before impact. As a result, the COR ("e") can vary from 0 to 1, with 1 being equivalent to a perfectly or completely elastic collision and 0 being equivalent to a perfectly or completely inelastic collision.

COR, along with additional factors such as club head speed, club head mass, ball weight, ball size and density, spin rate, angle of trajectory and surface configuration (i.e., dimple pattern and area of dimple coverage) as well as environmental conditions (e.g. temperature, moisture, atmospheric pressure, wind, etc.) generally determine the distance a ball will travel when hit. Along this line, the distance a golf ball will travel under controlled environmental conditions is a function of the speed and mass of the club and size, density and resilience (COR) of the ball and other factors. The initial velocity of the club, the mass of the club and the angle of the ball's departure are essentially provided by the golfer upon striking. Since club head speed, club head mass, the angle of trajectory and environmental conditions are not determinants controllable by golf ball producers and the ball size and weight are set by the U.S.G.A., these are not factors of concern among golf ball manufacturers. The factors or determinants of interest with respect to improved distance are generally the coefficient of restitution (COR) and the surface configuration (dimple pattern, ratio of land area to dimple area, etc.) of the ball.

The COR in solid core balls is a function of the composition of the molded core and of the cover. The molded core and/or cover may be comprised of one or more layers such as in multi-layered balls. In balls containing a wound core (i.e., balls comprising a liquid or solid center, elastic windings, and a cover), the coefficient of restitution is a function of not only the composition of the center and cover, but also the composition and tension of the elastomeric windings. As in the solid core balls, the center and cover of a wound core ball may also consist of one or more layers.

The coefficient of restitution is the ratio of the outgoing velocity to the incoming velocity. In the examples of this application, the coefficient of restitution of a golf ball was measured by propelling a ball horizontally at a speed of 125+/−5 feet per second (fps) and corrected to 125 fps against a generally vertical, hard, flat steel plate and measuring the ball's incoming and outgoing velocity electronically. Speeds were measured with a pair of Oehler Mark 55 ballistic screens available from Oehler Research, Inc., P.O. Box 9135, Austin, Tex. 78766, which provide a timing pulse when an object passes through them. The screens were separated by 36 inches and are located 25.25 inches and 61.25 inches from the rebound wall. The ball speed was measured by timing the pulses from screen 1 to screen 2 on the way into the rebound wall (as the average speed of the ball over 36 inches), and then the exit speed was timed from screen 2 to screen 1 over the same distance. The rebound wall was tilted 2 degrees from a vertical plane to allow the ball to rebound slightly downward in order to miss the edge of the cannon that fired it. The rebound wall is solid steel.

As indicated above, the incoming speed should be 125±5 fps but corrected to 125 fps. The correlation between COR and forward or incoming speed has been studied and a correction has been made over the ±5 fps range so that the COR is reported as if the ball had an incoming speed of exactly 125.0 fps.

The coefficient of restitution must be carefully controlled in all commercial golf balls if the ball is to be within the specifications regulated by the United States Golf Association (U.S.G.A.). As mentioned to some degree above, the U.S.G.A. standards indicate that a "regulation" ball cannot have an initial velocity exceeding 255 feet per second in an atmosphere of 75° F. when tested on a U.S.G.A. machine. Since the coefficient of restitution of a ball is related to the ball's initial velocity, it is highly desirable to produce a ball having sufficiently high coefficient of restitution to closely approach the U.S.G.A. limit on initial velocity, while having an ample degree of softness (i.e., hardness) to produce enhanced playability (i.e., spin, etc.).

Four golf balls in accordance with the present invention were formed, each using a preferred and commercially available high melting point thermoplastic material as an inner core component. Table 19, set forth below, summarizes these balls.

TABLE 19

|  |  | Capron ® 8351 | Lexan ® ML 5776-7539 | Pebax ® 3533 | Hytrel ® G-4074 | Control (Single Core) |
|---|---|---|---|---|---|---|
| Inner Core | size (inches) | 0.835 | 0.854 | 0.840 | 0.831 | — |
|  | weight (grams) | 5.33 | 6.14 | 5.08 | 5.81 | — |
|  | rebound % (100") | 78 | 83 | 65 | 61 | — |
|  | Shore C (surface) | — | — | 57 | 73 | — |
|  | Shore D (surface) | 75 | 83 | 36 | 47 | — |
| Outer Core | Cis 1,4 Polybutadiene | 100 | 100 | 100 | 100 | 100 |
| Formulation | Zinc oxide | 27 | 26 | 28 | 21 | 25 |
|  | Zinc stearate | 16 | 16 | 16 | 16 | 25 |
|  | Zinc diacrylate | 20 | 20 | 24 | 24 | 18 |
|  | 231XL | 0.9 | 0.9 | 0.9 | 0.9 | 0.9 |
|  |  | 163.9 | 162.9 | 168.9 | 161.9 | 158.9 |
| Double Core | size (inches) | 1.561 | 1.560 | 1.562 | 1.563 | 1.562 |
| Properties | weight (grams) | 37.7 | 37.8 | 37.8 | 37.5 | 37.8 |
|  | compression (Riehle) | 79 | 80 | 99 | 93 | 114 |
|  | COR | .689 | .603 | .756 | .729 | .761 |
| Molded Ball | size (inches) | 1.685 | 1.683 | 1.682 | 1.683 | 1.685 |
| Properties | weight (grams) | 45.3 | 45.5 | 45.5 | 45.2 | 45.4 |
|  | compression (Riehle) | 78 | 80 | 89 | 87 | 102 |
|  | COR | .750 | .667 | .785 | .761 | .788 |

Cover Stock Surlyn ® 8940 22
*T.B. MB Iotek ® 7030 75.35

| (used on all above balls) | Surlyn ® 9910 | 54.5 | Unitane ® 0-110 | 23.9 |
|---|---|---|---|---|
|  | Surlyn ® 8320 | 10 | Ultra Marine ™ Blue | 0.46 |
|  | Surlyn ® 8120 | 4 | Eastobrite ® OB-1 |  |
|  | T.B. MB* | 9.5 | Santonox ® R | 0.038 |
|  |  | 100.0 |  | 100.00 |

The invention has been described with reference to the preferred embodiments. Obviously, modifications and alterations will occur to others upon a reading and understanding the preceding detailed description. It is intended that the invention be construed as including all such modifications and alterations in so far as they come within the scope of the appended claims or the equivalents thereof.

What is claimed is:

1. A golf ball comprising:
   a core center component, the core center component composed of a thermoplastic material selected from the group consisting of polyether block amide, a nylon-ionomer blend, a polycarbonate and a polyester elastomer;
   a core layer disposed about said core center component, the core layer comprising a polybutadiene material;
   an inner cover layer disposed on said core layer, said inner cover layer having a Shore D hardness of less than 45; and
   an outer cover layer disposed on said inner cover layer, said outer cover layer comprising a polyurethane material, said outer cover layer having a Shore D hardness of at least 50.

2. The golf ball of claim 1 wherein said inner cover layer has a thickness of from 0.0075 to 0.0225 inches.

3. The golf ball of claim 2 wherein said inner cover layer has a thickness of from about 0.0125 to 0.0175 inches.

4. The golf ball of claim 3 wherein said inner cover layer has a thickness of from 0.015 to 0.0175 inches.

5. The golf ball of claim 1 wherein said outer cover layer has a thickness of from about 0.0075 to 0.0225 inches.

6. The golf ball of claim 5 wherein said outer cover layer has a thickness of from about 0.0125 inches to about 0.0175 inches.

7. The golf ball of claim 6 wherein said outer cover layer has a thickness of from about 0.015 inches to about 0.0175 inches.

8. The golf ball of claim 1 wherein said golf ball has a PGA compression of less than 115.

9. The golf ball of claim 8 wherein said golf ball has a PGA compression of less than 100.

10. The golf ball of claim 1 wherein said total thickness of said outer cover layer and said inner cover layer ranges from about 0.015 inches to about 0.045 inches.

11. The golf ball of claim 10 wherein said total thickness of said inner cover layer and said outer cover layer ranges from about 0.025 inches to about 0.035 inches.

12. The golf ball of claim 11 wherein the total thickness of said inner cover layer and said outer cover layer ranges from about 0.030 inches to about 0.035 inches.

13. A golf ball comprising:
   a core center component, the core center component composed of a thermoplastic material selected from the group consisting of polyether block amide, a nylon-ionomer blend, a polycarbonate and a polyester elastomer;
   a core layer disposed about said core center component, the core layer comprising a polybutadiene material;
   an inner cover layer disposed on said core layer, said inner cover layer having a thickness of from about 0.0075 inches to about 0.0225 inches; and
   an outer cover layer disposed on said inner cover layer, said outer cover layer comprising a polyurethane material, said outer cover layer having a thickness ranging from about 0.075 inches to about 0.0225 inches.

14. The golf ball of claim 13 wherein said inner cover layer has a Shore D hardness of less than 45.

15. The golf ball of claim 13 wherein said outer cover layer has a Shore D hardness of at least 50.

16. The golf ball of claim 13 wherein said inner cover layer has a thickness of from about 0.0125 inches to about 0.0175 inches.

17. The golf ball of claim 16 wherein said inner cover layer has a thickness of from about 0.015 inches to about 0.0175 inches.

18. The golf ball of claim 13 wherein said outer cover layer has a thickness ranging from about 0.0125 inches to about 0.0175 inches.

19. The golf ball of claim 18 wherein said outer cover layer has a thickness ranging from about 0.015 inches to about 0.0175 inches.

20. The golf ball of claim 13 wherein said golf ball exhibits a PGA compression of less than 115.

\* \* \* \* \*